United States Patent
Galvez et al.

(10) Patent No.: US 10,586,436 B1
(45) Date of Patent: Mar. 10, 2020

(54) SYSTEM AND METHOD FOR TRACKING STUDENTS

(71) Applicant: Sensormatic Electronics, LLC, Boca Raton, FL (US)

(72) Inventors: Miguel Galvez, Plaistow, NH (US); Walter A. Martin, Ballymena (GB); Danny Hyun, Irvine, CA (US); Blair Germano, Delray Beach, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 16/112,014

(22) Filed: Aug. 24, 2018

(51) Int. Cl.
| | | |
|---|---|---|
| *G08B 21/02* | (2006.01) | |
| *G08B 13/196* | (2006.01) | |
| *H04W 4/029* | (2018.01) | |
| *H04W 4/024* | (2018.01) | |

(52) U.S. Cl.
CPC ....... *G08B 21/0275* (2013.01); *G08B 13/196* (2013.01); *G08B 21/0261* (2013.01); *G08B 21/0269* (2013.01); *G08B 21/0294* (2013.01); *H04W 4/024* (2018.02); *H04W 4/029* (2018.02)

(58) Field of Classification Search
CPC .............. G08B 21/0275; G08B 13/196; G08B 21/0261; G08B 21/0269; G08B 21/0294; H04W 4/024; H04W 4/029
USPC ................................ 340/572.1, 10.1, 539.13
See application file for complete search history.

(56) References Cited

U.S. PATENT DOCUMENTS

| | | | | |
|---|---|---|---|---|
| 5,886,634 | A * | 3/1999 | Muhme ............... | G07C 9/00111 340/5.31 |
| 6,847,892 | B2 * | 1/2005 | Zhou ..................... | G01S 5/0027 340/426.1 |
| 9,195,866 | B1 * | 11/2015 | Mehranfar ............ | H04W 4/029 |
| 9,400,902 | B2 * | 7/2016 | Schoner ............. | G06K 7/10366 |
| 9,977,935 | B1 * | 5/2018 | Laranang ........... | G07C 9/00031 |
| 9,980,112 | B1 | 5/2018 | Newby et al. | |

(Continued)

OTHER PUBLICATIONS

Dunbar, G. "Downington to continue using 'SafeStop' app," Dailylocal.com, 1-2 (Jan. 23, 2016).

(Continued)

*Primary Examiner* — Eric Blount
(74) *Attorney, Agent, or Firm* — HoustonHogle LLP

(57) ABSTRACT

A student tracking system tracks students' location traveling to and from schools and provides information about the students to responsible parties associated with the students such as parents, bus drivers, school administrators, and faculty. Readers read identification information from tags (e.g. radiofrequency identification tags) associated with the students and/or entrance/exit points of school buses, school buildings and/or classrooms and send the identification information along with location information (e.g. via a global navigation satellite system receiver) to a tracking and authorization module, which generates event information for entering and exiting events at the entrance/exit points, verifies that the event information matches predetermined school schedule, bus and route information, detects anomalies in the event information, and generates attendance information. The tracking and authorization module sends the event, verification, anomaly and/or attendance information to devices operated by the responsible parties.

20 Claims, 19 Drawing Sheets

(56) References Cited

U.S. PATENT DOCUMENTS

| | | | |
|---|---|---|---|
| 2005/0258937 A1* | 11/2005 | Neuwirth | G06Q 10/06 340/5.92 |
| 2006/0158308 A1* | 7/2006 | McMullen | G06Q 10/00 340/5.61 |
| 2008/0122626 A1* | 5/2008 | Ehrman | G06Q 10/08 340/572.1 |
| 2008/0218335 A1 | 9/2008 | Attar | |
| 2010/0188194 A1* | 7/2010 | Shiau | G06Q 10/08 340/10.1 |
| 2011/0054731 A1 | 3/2011 | DeRose et al. | |
| 2014/0035726 A1* | 2/2014 | Schoner | G06K 7/10366 340/8.1 |
| 2014/0125502 A1* | 5/2014 | Wittkop | G08G 1/127 340/989 |
| 2014/0253286 A1* | 9/2014 | Bianco | G07C 1/02 340/5.31 |
| 2017/0215034 A1 | 7/2017 | Blowers et al. | |
| 2018/0184255 A1 | 6/2018 | Marson | |

OTHER PUBLICATIONS

"Northstar Child Safety Platform," http://northstar.global/product/, 1-3, Accessed on Feb. 27, 2018.

"SafeStop—Your School Buss Tracking App," http://www.safestopapp.com/, 1-2, Accessed on Feb. 27, 2018.

"SkoolSmart Child Safety First," http://web.archive.org/web/20180221235126/http://www.skoolsmart.net/skoolsmart.html, 1-6, Access on Feb. 21, 2018.

"Student Tracking & Security Solutions," http://www.swipek12.com/Swipek12/, 1, Accessed on Feb. 27, 2018.

* cited by examiner

SYSTEM AND METHOD FOR TRACKING STUDENTS

RELATED APPLICATIONS

This application is related to U.S. application Ser. No. 16/112,007 filed on Aug. 24, 2018, entitled "System and method for tracking locations of students within school buildings," which is incorporated herein by reference in its entirety.

BACKGROUND OF THE INVENTION

Student tracking systems are often used to track the location of students of schools, such as public or private kindergartens, elementary schools, middle schools, and high schools. These systems range from mobile applications that track the location of mobile computing devices (e.g. smart phones) or other tracking devices of the students to more advanced systems that also track the location of school buses transporting the students to and from school, the location of the students while at school, and provide image data depicting the students at the schools or on the school buses. Typically, student tracking systems use global navigation satellite systems (GNSS) such as the global positioning system (GPS). GNSS receivers of the mobile computing devices or tracking devices receive positioning signals from GNSS satellites, which are then used to generate location information for the students or buses. The student tracking systems then use the location information to determine if the students boarded the buses and whether they arrived at school.

SUMMARY OF THE INVENTION

There is a need for a student tracking system with more precise tracking and notification capabilities that notifies parents of the students when the student actually enters the school bus and actually enters the school building as opposed to simply tracking the location of the student.

A student tracking system according to the present invention provides more precise verification of entering and exiting events (e.g. the students physically entering or exiting the school or bus) and sends notifications to parents of the students and school officials (e.g. teachers, administrators, security personnel) based on an analysis of the entering and exiting events along with student, bus, route, and schedule information (for example). These notifications might include confirmation of the entering and exiting events, detailed information about the entering and exiting events such as when the student enters the bus or school building and/or information about anomalies detected by the student tracking system such as the student not boarding the bus or arriving at school by a certain time. The student tracking system also alerts the school officials when unauthorized people enter the school and generates attendance information for the students.

This functionality is implemented using readers and tags. In general, the readers interrogate the tags, and the tags send unique identification information to the readers. In one embodiment, the readers are stationed at the school and on the bus (e.g. at the entrance/exit), and the tags are carried by the students (e.g. as mobile computing devices, wearable beacon devices, or identification badges) and transmit identification information associated with the student. In another embodiment, the readers are mobile computing devices carried by the students, and the tags are stationed at the school and on the bus and transmit identification information associated with the door or bus where they are stationed. Accordingly, as the student enters the bus or the school, the reader detects the presence of the tag and reads the embedded identification information. That information is used to generate event information for the entering or exiting event, and a notification is sent to the parents of the student based on the event information, contact information for the student and/or other information accessible to the student tracking system. In one example, the notification is a text message indicating that the student boarded the bus, the number or other identifying information of the bus, and whether this was the correct bus for the student. A similar notification is sent when the student enters the school.

Additionally, a surveillance function can be integrated with the above mentioned system such that when an individual enters the school but a corresponding entering event is not detected (e.g. from a reader at the door scanning a valid tag of the entering individual), the school administrators or a school resource officer is notified.

The student tracking system further includes sign out functionality utilizing the tags. In one example, when the student leaves the school with a registered approved guardian they are signed out by a reader at the door designated for in school pickups or a by a handheld reader (e.g. mobile application executing on a mobile computing device) operated by a faculty member. In another example, when the student exits the bus at their assigned bus stop the school bus reader will scan the tag as the student exits to sign out the student and register the exiting event.

In general, according to one aspect, the invention features a system for tracking students of schools, the system comprising readers and a tracking and authorization module. The readers comprise wireless receivers for receiving identification information from tags during entering and exiting events of the students. The tracking and authorization module generates event information for the entering and exiting events based on the identification information received by the readers and sends the event information to parent/teacher devices.

In embodiments, readers stationed at the schools or on buses for transporting the students to and from the schools receive identification information associated with the students from mobile computing devices, wearable beacons and/or identification badges of the students, readers of the students receive identification information associated with the buses from tags stationed on the buses, and/or readers of the students receive identification information associated with areas of the schools from tags stationed at the areas of the schools. The tags comprise wireless transmitters and/or passive radio-frequency identification tags for sending the identification information. The parent/teacher devices are operated by parents of the students, teachers, school administrators, bus drivers and/or security personnel of the schools, and mobile applications executing on the parent/teacher device render graphical user interfaces on displays of the parent/teacher devices, and the parent/teacher devices display the event information via the graphical user interfaces.

In one example, the readers or the tags are installed on the buses, and the exiting and entering events represent instances of the students entering and exiting the buses. The readers comprise global navigation satellite system (GNSS) receivers and generate location information for the buses based on GNSS data received by the GNSS receivers The tracking and authorization module receives the location information and sends the location information to the parent/ teacher devices, generates and stores bus and route information for the buses and the students based on the location information and the event information, generates bus proximity information with respect to stops assigned to the students based on the location information and sends the bus proximity information to parent/teacher devices operated by parents of the students, generates optimal route information based on the location information and the event information and sends the optimal route information to parent/teacher devices operated by drivers of the buses, generates occupancy information for the buses based on the event information and sends the occupancy information to the parent/teacher devices, generates verification information based on the event information and stored bus and route information for the students and sends the verification information to the parent/teacher devices, and/or generates anomaly information based on accumulated location information and bus and route information for the buses and sends the anomaly information to the parent/teacher devices. The readers or the tags are also installed at emergency doors of the buses, and the tracking and authorization module sends alerts to the parent/teacher devices in response to determining that the emergency doors were accessed based on the event information.

In another example, the readers or the tags are stationed at entrance and exit points of the school, and the exiting and entering events represent instances of the students and/or other authorized individuals entering and exiting the school. The readers stationed at the entrance and exit points include mobile computing devices operated by faculty, administrators and/or security personnel of the school, and the tracking and authorization module verifies the entering and exiting events based on whether the readers also received identification information from tags installed on authorized vehicles associated with the students. Additionally, Surveillance cameras capture image data depicting entering and exiting events at the entrance and exit points of the school, and the tracking and authorization module receives the image data, detects entering and exiting events based on the image data, determines whether identification information corresponding to the detected entering and exiting events was received from the readers, and generates alerts in response to determining that no corresponding identification information was received.

In yet another example, the readers or the tags are stationed at entrance and exit points of classrooms of the school, and the exiting and entering events represent instances of the students and/or other authorized individuals entering and exiting the classrooms. The tracking and authorization module generates attendance information based on the event information and sends the attendance information to the parent/teacher devices.

In general, according to another aspect, the invention features a method for tracking students of schools. Readers receive identification information from tags during entering and exiting events of the students. Event information is then generated for the entering and exiting events based on the identification information received by the readers and sent to parent/teacher devices.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
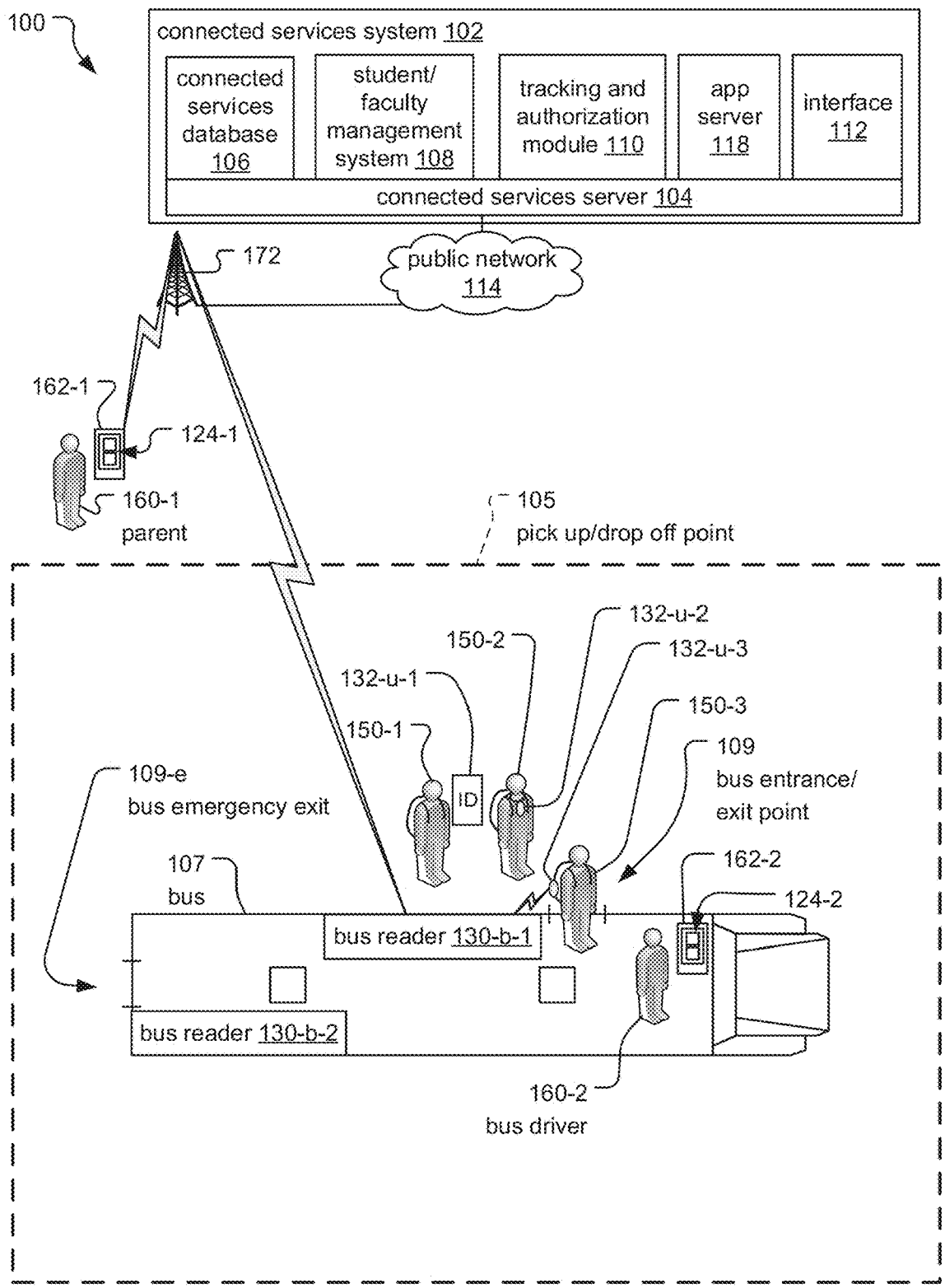
FIG. 1A is a schematic diagram of an exemplary student tracking system according to one embodiment of the present invention in which bus readers receive identification information from student tags as students enter and/or exit a bus.

FIG. 1A is a schematic diagram of an exemplary student tracking system 100 according to one embodiment of the present invention.

In general, the student tracking system 100 tracks students 150 traveling to and from a school premises 103, which typically includes one or more school buildings 113 along with outdoor areas such as parking lots, fields, or walkways, associated with public or private kindergartens, elementary schools, middle schools, and/or high schools, among other examples. The student tracking system 100 provides information about the students 150 to responsible parties 160 associated with the students 150, such as parents 160-1, bus drivers 160-2, school administrators 160-3, and faculty 160-4, for example, by notifying the responsible parties 160 when the students have safely arrived at the school premises 103 and entered the school buildings 113.

Some of the students 150 travel on buses 107, which are vehicles for transporting the students 150 to and from the school premises 103. The buses 107 are operated by the bus drivers 160-2, which are school personnel who conduct the buses 107 to and from designated pick up/drop off points such as bus stops 105. Normally, specific buses 107 and bus stops 105 are assigned to the students 150 based on, for example, a location of the student's 150 home, and the buses 107 pick up and drop off the students 150 according to predetermined school and bus route schedules.

The student tracking system 100 tracks the students 150 by detecting entering and exiting events, which are instances of the students 150 entering and/or exiting the bus 107 and/or the school building 113, respectively via bus entrance/exit points 109 (e.g. passenger doors of the buses 107) and school entrance/exit points 111, which are doors or other access points of the school 113 designated for the students 150 to enter and exit (e.g. a main front door granting access to a lobby of the school building 113). For example, in a typical school day, a student 150 travels to and waits at their assigned bus stop 105 for their assigned bus 107 to arrive. Upon arrival of the bus 107, the student 150 enters the bus 107 via the bus entrance/exit point 109 and is transported to the school premises 103. At the school premises 103, the student 150 exits the bus 107 via the bus entrance/exit point 109 and enters the school building 113 via the school entrance/exit point 111. The student 150 remains inside the school building 113 for a predetermined duration according to the school's schedule. The student 150 then exits the school building 113 via the school entrance/exit point 111 and enters their assigned bus 107 via the bus entrance/exit point 109. After being transported from the school premises 103 to their assigned bus stop 105, the student 150 then exits the bus 107 via the bus entrance/exit point 109 and travels home.

In general, the student tracking system 100 includes readers 130 and tags 132 for detecting the entering and exiting events. The readers 130 receive identification information from the tags 132 in response to engaging with the tags 132, for example, by bringing a reader 130 and a tag 132 in close proximity with respect to each other. The identification information for the tag 132, which is uniquely assigned to the tags 132 and might include a device ID (such as a MAC address or serial number), is used in confluence with identification information for the reader 130 and other information, to determine that certain readers 130 and certain tags 132 were necessarily in the same locations at certain times. In this way, the student tracking system 100 tracks the locations of the students 150.

According to one embodiment, the readers 130 and tags 132 are radiofrequency identification (RFID) systems, in which the readers 130 interrogate the tags 132 by sending signals to the tags 132. In response, the tags 132 respond with the identification information. The RFID system can include passive tags 132, which require interrogation by the readers 130 for power and do not transmit unless interrogated, or active tags 132, which are powered independently (for example, by a battery) and responsively transmit signals containing the identification information.

More specifically, in one configuration of the student tracking system 100, the bus readers 130-b are stationed at the bus entrance/exit points 109 (including at bus emergency exits 109-e), and school readers 130-s are stationed at the school entrance/exit points 111. Student tags 132-*u* are carried by the students 150 (e.g. as mobile computing devices, wearable beacon devices, or identification badges) and transmit identification information associated with the students 150 to the bus readers 130-*b* and school readers 130-*s* during the entering and exiting events.

In another configuration of the student tracking system 100, student readers 130-*u* are carried by the students 150 (e.g. as the students' mobile computing devices). Bus tags 132-*b* are stationed at the bus entrance/exit points 109 and transmit identification information associated with the bus 107. School tags 132-*s* are stationed at the school entrance/exit points 111 and transmit identification information associated with the school entrance/exit point 111 and/or different areas of the school premises 103 to the student readers 130-*u* during the entering and exiting events.

The readers 130 send the identification information associated with the students 150, entrance/exit points, areas of the school premises 103 and/or bus 107, along with other information such as signal strength information and location information (e.g. generated via a global navigation satellite system (GNSS) receiver) to a connected services system 102 of the student tracking system 100. In general, the connected services system 102 generates event information for the entering and exiting events, which might include location information, time and date information, or whether the student 150 was entering or exiting, among other examples and sends notifications including the event information to parent/teacher devices 162, which are computing devices (e.g. desktop computers, laptop computers, mobile computing devices such as smart phones or tablets) operated by the responsible parties 160 associated with the students 150. The parent/teacher devices 162 present the event information to the responsible parties 160, via graphical user interfaces 124 rendered on displays of the parent/teacher devices 162, for example, by mobile applications executing on the devices.

The readers 130 and the parent/teacher devices 162 communicate with the connected services system 102 via a public network such as the internet. The readers 130 and parent/teacher devices 162 connect to the public network 114 via wireless communication links to a cellular radio tower 172 of a mobile broadband or cellular network and/or via a private data network providing connectivity with the public and/or private network 114 such as an enterprise network, Wi-Max, or Wi-Fi network, for example.

The connected services system 102 is typically implemented as a cloud system. It can be run on a proprietary cloud system or implemented on one of the popular cloud systems operated by vendors such as Alphabet Inc., Amazon, Inc. (AWS), or Microsoft Corporation.

As a result, the connected services system 102 typically operates on a connected services server system 104. In some cases, this server system 104 is one or more dedicated servers. In other examples, they are virtual servers.

The connected services server system 104 executes modules and applications, including a tracking and authorization module 110 and an app server 118. Each of these modules is associated with separate tasks. In some cases, these modules are discrete modules or they are combined with other modules into a unified code base. They can be running on the same server or different servers, virtualized server system, or a distributed computing system.

The connected services system 102 includes a connected services database 106 and a student/faculty management system 108. The connected services database 106 maintains information about the school premises 103 including building management system information. The connected services database 106 also includes device information for devices of the student tracking system 100, including identification information for readers 130 and/or tags 132 associated with location information for the areas of the school premises 103 or buses 107 where the readers 130 and/or tags 132 are stationed. The student/faculty management system 108 includes student and faculty information, including biographic and contact information as well as the identification information for readers 130 and/or tags 132 associated with the students 150 and faculty.

The tracking and authorization module 110 generates the event information based on the identification information for the readers 130 and tags 132, signal strength information and location information received from the readers 130. The event information pertains to the entering and exiting events and can include time and date information, the location (e.g. which bus, door, classroom), and whether the student 150 entered or exited.

The app server 118 communicates with the parent/teacher devices 162, for example, by sending the event information and any other relevant information to the parent/teacher devices 162 to be displayed (e.g. via the graphical user interface 124).

The connected services system 102 also includes a building management system interface 112. The building management system interface 112 operates as the interface between the tracking and authorization module 110 and devices of building management systems controlling the school premises 103 such as intrusion, security and access control systems. In particular, the building management system interface 112 converts instructions from the authorization and tracking module 110 into instructions that are formatted into the protocol implemented by the building management system. Additionally, the building management system interface 112 receives information from the building management systems and converts the information into a uniform format that can be consumed by the authorization and tracking module 110, regardless of the underlying protocol implemented by the building management systems. In one example, a surveillance camera 119 of a security system installed on the school premises 103 captures image data depicting entering and exiting events at the school entrance/exit point 111 and sends the image data to the tracking and authorization module 110 via the building management system interface 112.

In the illustrated example, the bus 107 operated by the bus driver 160-2 picks up students 150 at the bus stop 105.

The students 150 carry student tags 132-*u*. More specifically, student 150-1 carries student tag 132-*u*-1, which is an identification badge, student 150-2 carries student tag 132-*u*-2, which is a wearable beacon worn around the student's neck, and student 150-3 carries student tag 132-*u*-3, which is a wearable beacon attached to the student's backpack.

The bus 107 includes two bus readers 130-*b*. Specifically, the bus reader 130-*b*-1 is stationed at the main bus entrance/exit point 109, while the bus reader 130-*b*-2 is stationed at the bus emergency exit 109-*e*.

As student 150-3 enters the bus via the main bus entrance/exit point 109, the student tag 132-*u*-3 carried by student 150-3 and the bus reader 130-*b*-1 come in close proximity, and the bus reader 130-*b*-1 reads the identification information from the student tag 132-*u*-3.

The bus reader 130-*b*-1 sends the identification information to the tracking and authorization module 110, which generates and sends event information to the parent/teacher device 162-1 (e.g. a smart phone) operated by the parent 160-1 of one of the students 150. In one example, the module determines which student 150 is associated with the tag identification information matching the tag identification information read by the bus reader 130-*b*-1 and which bus 107 is associated with the reader identification information provided by the bus reader 130-*b*-1. The event information reflects that the matching student 150 is inferred to have boarded the matching bus 107.

The parent/teacher device 162-1 presents the event information to the parent 160-1 via the graphical user interface 124-1 rendered on the display of the parent/teacher device 162-1. Similarly, the tracking and authorization 110 sends the event information to the parent/teacher device 162-2 (e.g. smart phone) of the bus driver 160-2 to be presented to the bus driver 160-2 in a similar manner.

Figure 1B:
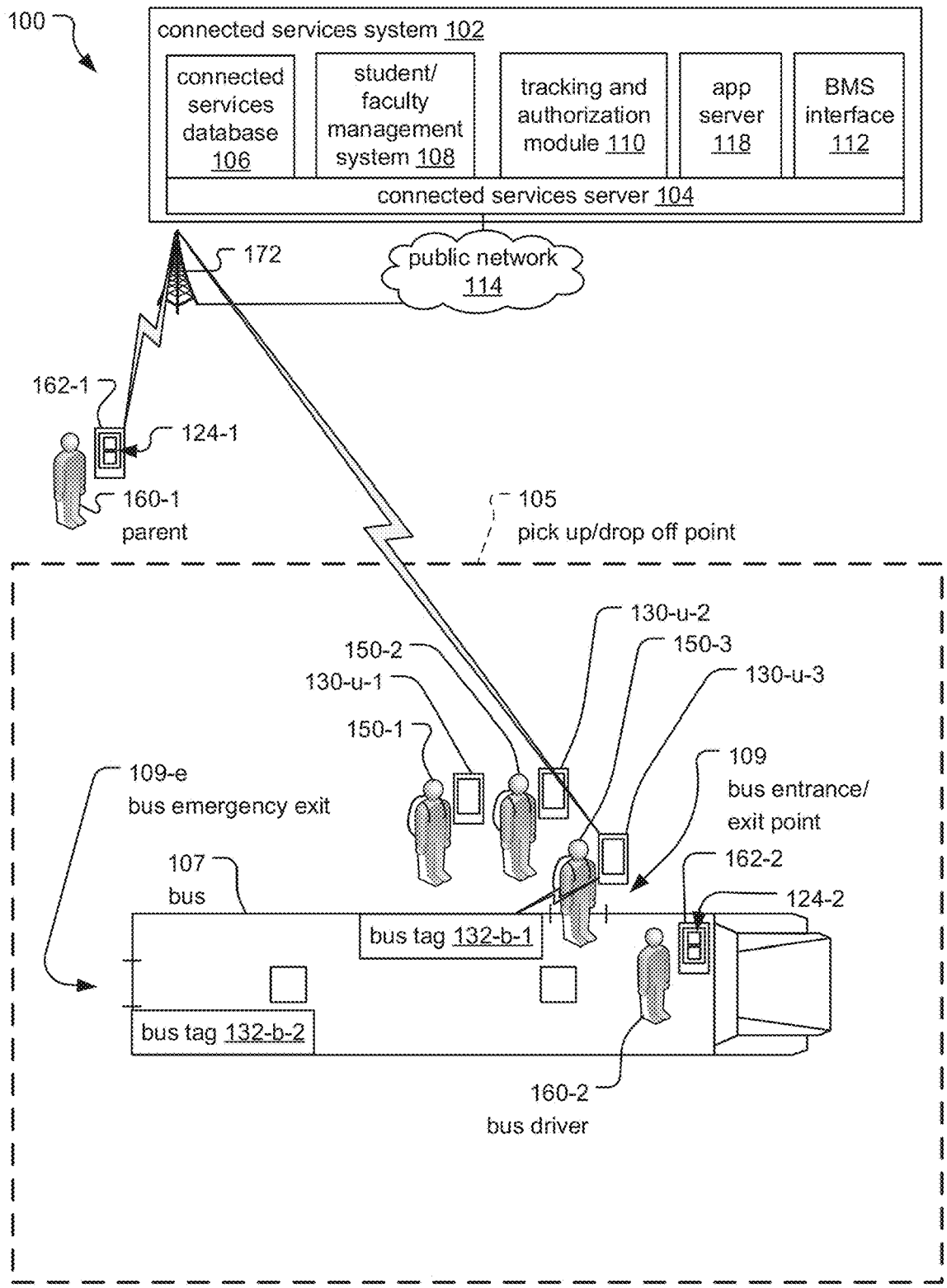
FIG. 1B is a schematic diagram of the student tracking system according to another embodiment in which student readers receive the identification information from bus tags as the students enter and/or exit the bus.

FIG. 1B is a schematic diagram of the student tracking system 100 according to another embodiment of the present invention.

As before, the illustrated example shows students 150 being picked up by a bus 107 at a bus stop 105.

Now, however, the students 150 carry student readers 130-*u* (e.g. mobile computing devices).

The bus 107 includes two bus tags 132-*b*. Specifically, the bus tag 132-*b*-1 is stationed at the main bus entrance 109, while the bus tag 132-*b*-2 is stationed at the bus emergency exit 109-*e*.

As student 150-3 enters the bus via the main bus entrance/exit point 109, the student reader 130-*u*-3 operated by student the 150-3 comes in close proximity with the bus tag 132-*b*-1, and the student reader 130-*u*-3 reads the identification information from the bus tag 132-*b*-1.

The student reader 130-*u*-3 sends the identification information to the tracking and authorization module 110, which generates and sends event information to the parent/teacher device 162-1 (e.g. a smart phone) operated by the parent 160-1 of the student 150-2. In one example, the module determines which bus 107 is associated with the tag identification information matching the tag identification information read by the student reader 130-*u*-3 and which student 150 is associated with the reader identification information provided by the student reader 130-*u*-3. The event information reflects that the matching student 150 is inferred to have boarded the matching bus 107.

Figure 2A:
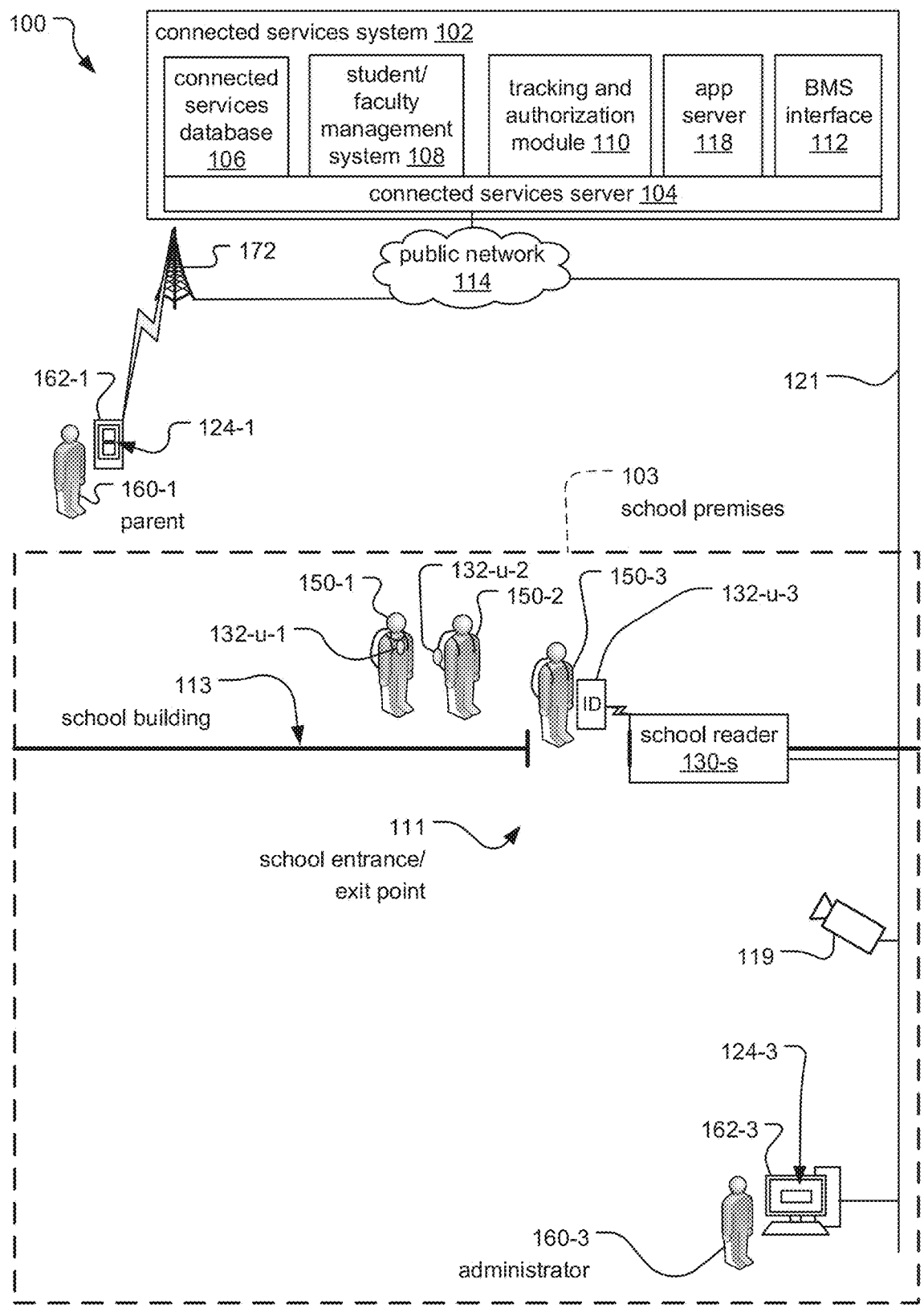
FIG. 2A is a schematic diagram of the student tracking system according to another embodiment in which school readers receive the identification information from the student tags as the students enter and/or exit a school building.

FIG. 2A is a schematic diagram of the student tracking system 100 according to another embodiment of the present invention.

Here, the student tracking system 100 detects entering and exiting events at the school entrance/exit point 111 of the school building 113 via a school reader 130-*s* stationed at the school entrance/exit point 111, which reads identification information from the student tags 132-*u* carried by the students 150 as the students 150 enter the school building 113 through the school entrance/exit point 111 and the student tags 132-*u* are placed in close proximity to the school reader 130-*s*.

The school reader 130-*s* sends the identification information to the tracking and authorization module 110, which generates and sends event information to the parent/teacher device 162-1 (e.g. a smart phone) operated by the parent 160-1 of the student 150. In one example, the module determines which student 150 is associated with the tag identification information matching the tag identification information read by the school reader 130-*s* and which school entrance/exit point 111 is associated with the reader identification information provided by the school reader 130-*s*. The event information reflects that the matching student 150 is inferred to have entered the matching school entrance/exit point 111.

In the illustrated example, the student tracking system 100 also includes a data network 121, a surveillance camera 119, and a parent/teacher devices 162-3 (e.g. desktop computer) operated by a school administrator 160-3. The data network 121 is a wired and/or wireless network connecting devices on the school premises 103 such as the parent/teacher device 162-3, the surveillance camera 119 and the school reader 130-*s* to the public network 114 and the connected services system 102.

The parent/teacher device 162-3 operated by the school administrator 160-3 also receives the event information from the connected services system 102 as previously described. The device might also be used to configure the student tracking system 100 by, for example, providing configuration information, student and faculty information, schedule information, and bus and route information, among other examples.

The surveillance camera 119 captures image data depicting the entering and exiting events at the school entrance/exit point 111 and sends the image data to the tracking and authorization module 110 via the building management system interface 112. In one example, the tracking and authorization module 110 correlates portions of the image data with the entering and exiting events and includes the image data in the event information sent to the parent/teacher devices 162 in order to provide a visual confirmation for parents 160-1 (for example) that the students 150 safely arrived at the school premises 103 and entered the school building 113. In another example, the tracking and authorization module 110 detects an entering and exiting event depicted in the image data but does not detect a corresponding entering and exiting event via the readers 130 and tags 132, determines that an unauthorized individual has entered the school building 113, and sends a notification to the parent/teacher device 162-3 operated by the school administrator 160-3.

Figure 2B:
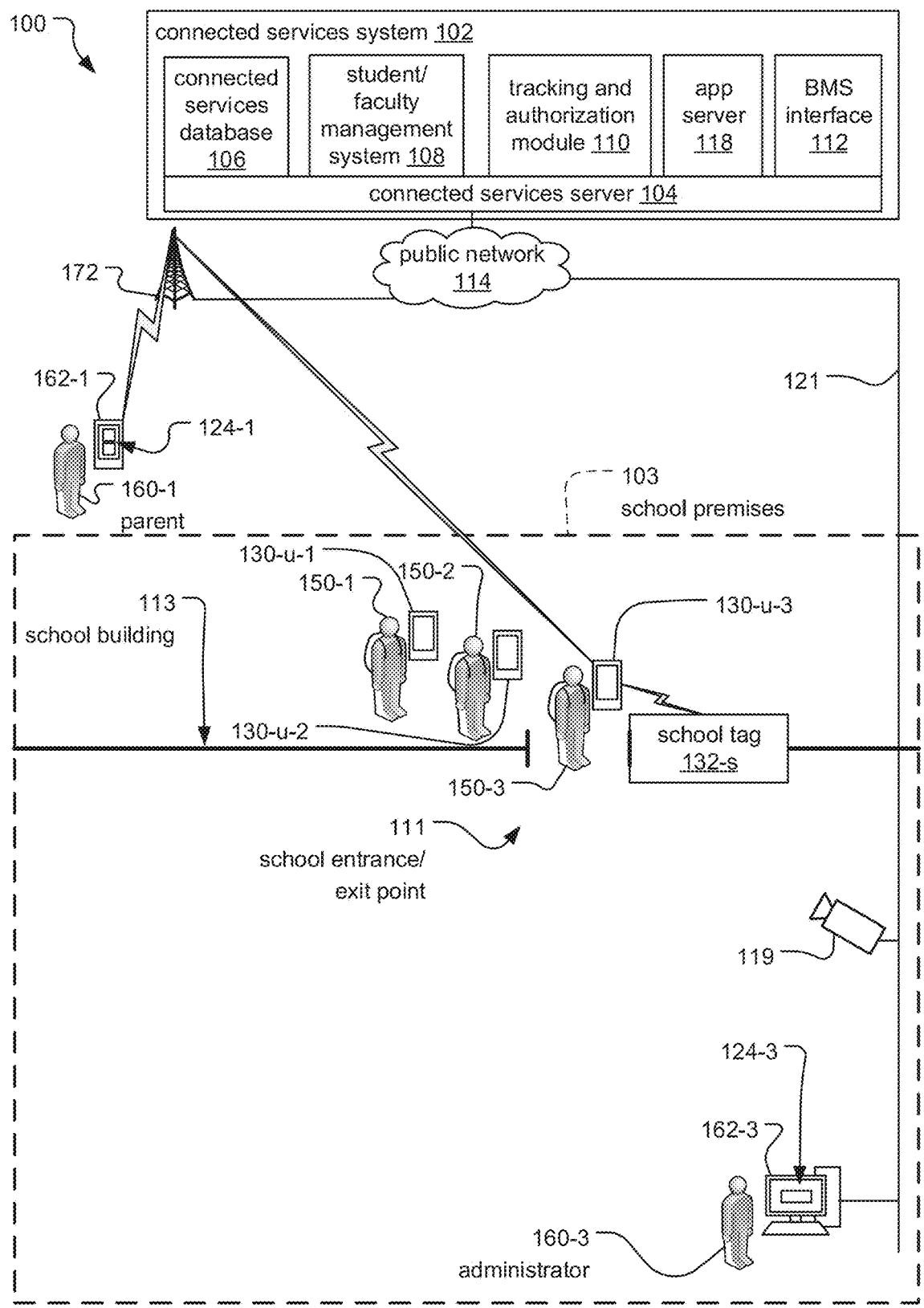
FIG. 2B is a schematic diagram of the student tracking system according to another embodiment in which the student readers receive the identification information from school tags as the students enter and/or exit the school building.

FIG. 2B is a schematic diagram of the student tracking system 100 according to another embodiment of the present invention.

As before, the system tracks students 150 entering the school building 113. Now, however, the students 150 carry student readers 130-*u* (e.g. mobile computing devices), and a school tag 132-*s* is stationed at the school entrance/exit point 111. As each student enters the school building 113 via the school entrance/exit point 111, the student readers 130-*u* come or are placed in close proximity to the school tag 132-*s*, and the student readers 130-*u* read the identification information from the school tag 132-*s*.

The student reader 130-*u* sends the identification information to the tracking and authorization module 110, which generates and sends event information to the parent/teacher device 162-1 (e.g. a smart phone) operated by the parent 160-1 of the student 150. In one example, the module determines which school entrance/exit point 111 is associated with the tag identification information matching the tag identification information read by the student reader 130-*u* and which student 150 is associated with the reader identification information provided by the student reader 130-*u*. The event information reflects that the matching student 150 is inferred to have entered the matching school entrance/exit point 111.

Figure 3:
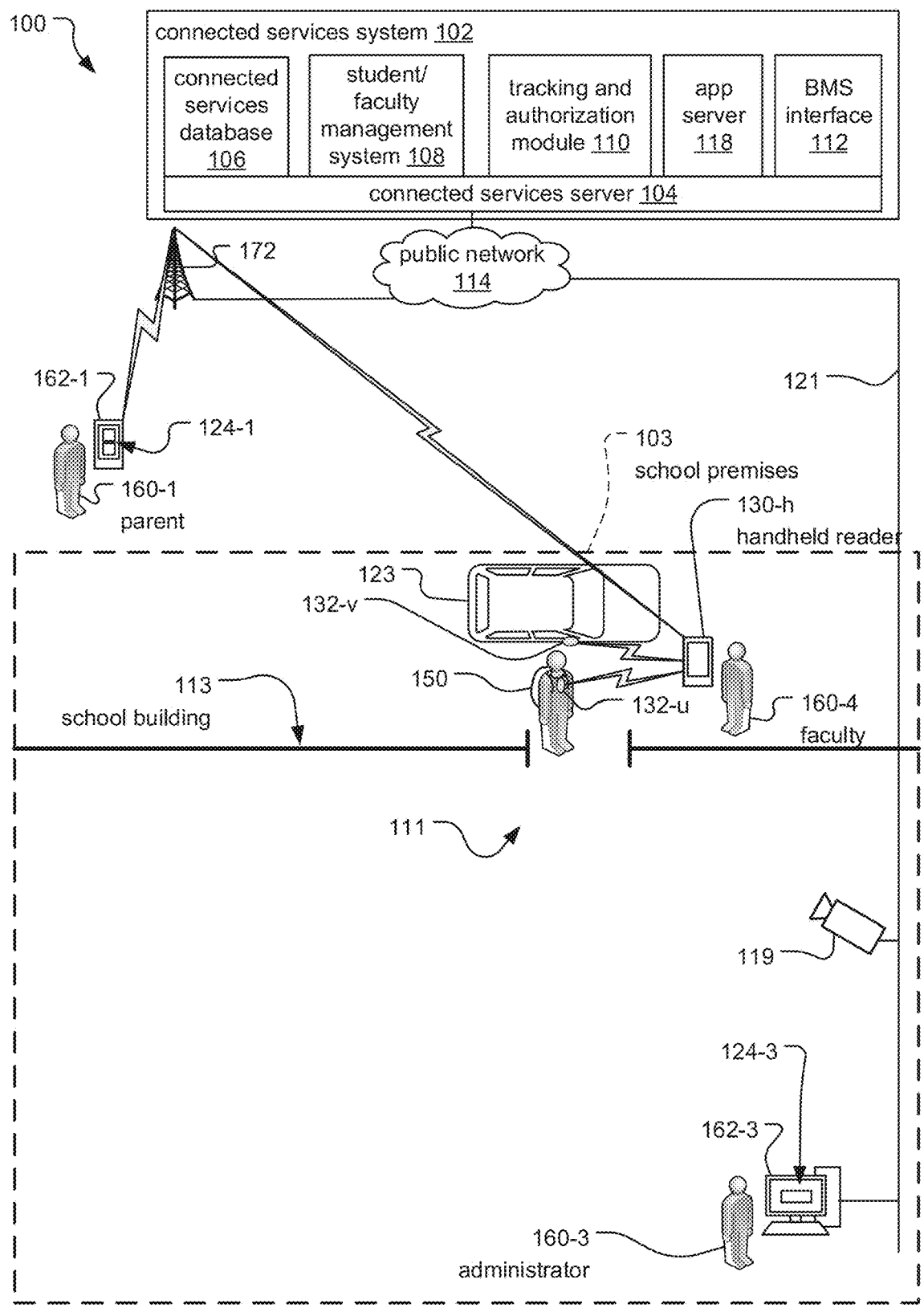
FIG. 3 is a schematic diagram of the student tracking system according to another embodiment in which a handheld reader operated by a faculty member of the school receives the identification information from student tags and vehicle tags for authorized vehicles associated with the students.

FIG. 3 is a schematic diagram of the student tracking system 100 according to another embodiment of the present invention.

Now, the student tracking system 100 includes a handheld reader 130-*h* operated by a faculty member 160-4 stationed at the school entrance/exit point 111, a student tag 132-*u* carried by a student 150 who is exiting the school building 113 through the school entrance/exit point 111, and a vehicle tag 132-v attached to an authorized vehicle 123 associated with the exiting student 150.

As before, the handheld reader 130-h (e.g. a mobile computing device executing a mobile application) reads the identification information from the student tag 132-u. Now, however, the faculty member 160-4 approaches the vehicle 123 and brings the handheld reader 130-h in proximity to the vehicle tag 132-v, and the handheld reader 130-h reads the identification information from the vehicle tag 132.

The handheld reader 130-h sends the identification information from the student tag 132-u and the vehicle tag 132-v to the tracking and authorization module 110, which generates and sends event information to the parent/teacher device 162-1 (e.g. a smart phone) operated by the parent 160-1 of the student 150. As before, the module determines which student 150 is associated with the tag identification information matching the tag identification information read by the handheld reader 130-h and which school entrance/exit point 111 is associated with the reader identification information provided by the handheld reader 130-h. The event information reflects that the matching student 150 is inferred to have exited through the matching school entrance/exit point 111.

Now, however, the tracking and authorization module 110 additionally determines whether the tag identification information read from the vehicle tag 132-v matches the tag identification information for an authorized vehicle 132 associated with the student 150. In this way, the student tracking system 100 tracks not only when and where the students 150 exited the school building 113, but also whether the students 150 departed the school premises 103 in authorized vehicles 123 (e.g. driven by guardians, babysitters, or family members of the student 150).

Figure 4:
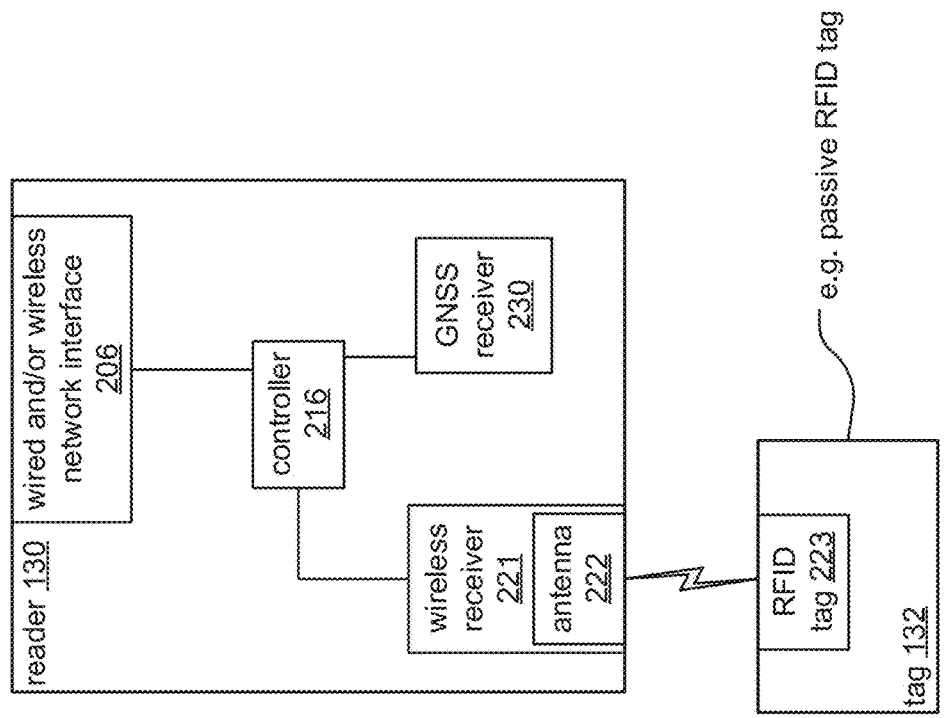
FIG. 4 is a schematic diagram of the reader and tag of the student tracking system according to one embodiment in which the tag is a passive radiofrequency identification (RFID) tag.

FIG. 4 is a schematic diagram of the reader 130 and the tag 132 of the student tracking system 100 according to one embodiment of the present invention.

The tag 132 includes a passive RFID tag 223, which transmits identification information for the tag 132 in response to being scanned or interrogated by the reader 130.

The reader 130 includes a controller 216, a wired and/or wireless network interface 206, a wireless receiver 221 and antenna 222, and a GNSS receiver 230. The controller 216 executes firmware/operating system instructions and generally directs the functionality of the reader 130. The wired and/or wireless network interface 206 provides connectivity with the connected services system 102 via the public network 114 and/or the data network 119 on the school premises 103. The wireless receiver 221 reads the identification information from the RFID tag 223 by scanning the RFID tag 223 (e.g. sending a wireless signal via the antenna 222) and receiving the identification information transmitted by the RFID tag 223. The GNSS receiver 230 receives positioning signals from GNSS satellites (such as GPS satellites) and sends positioning signals to the controller 216, which uses them to generate location information indicating the current location of the reader 130.

Figure 5:
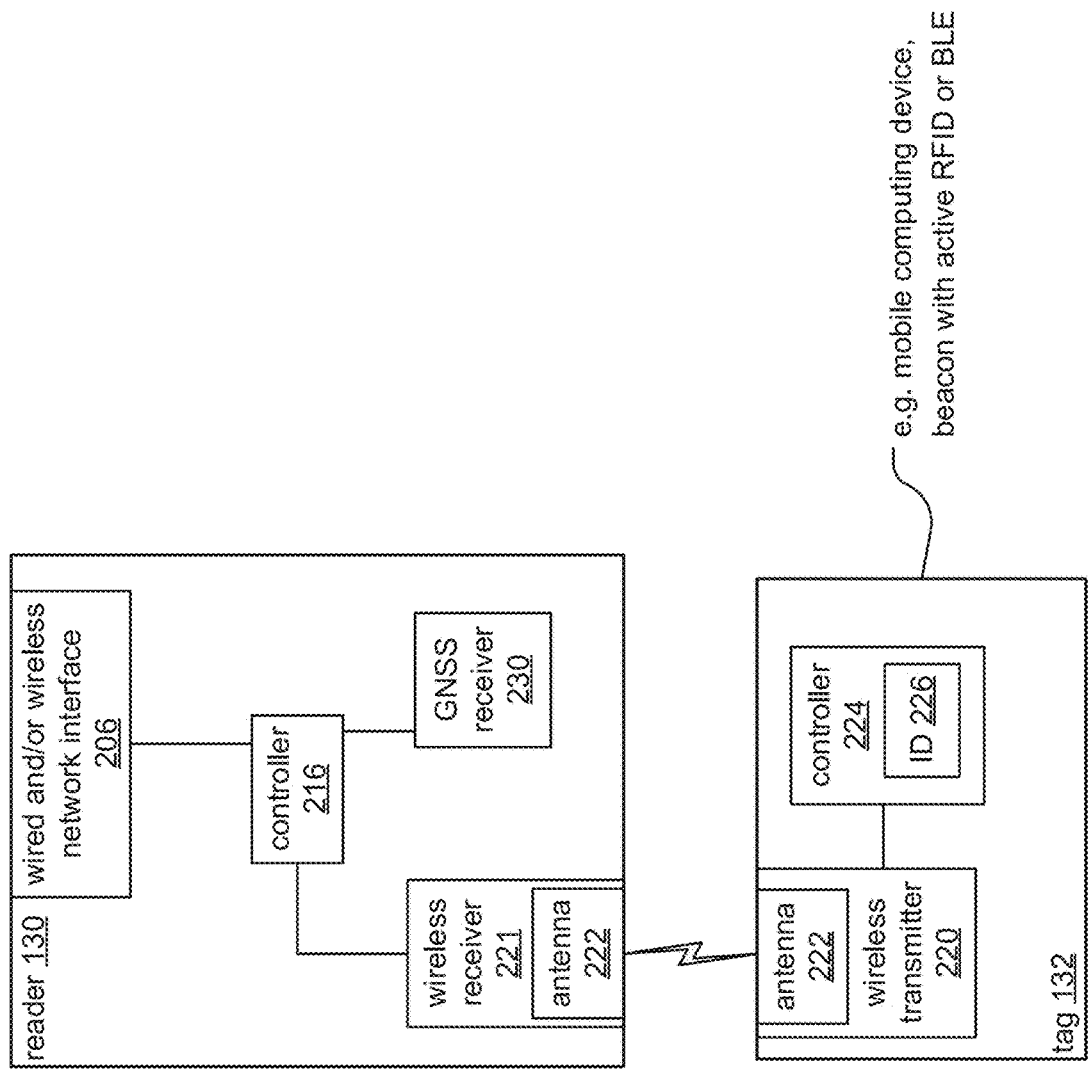
FIG. 5 is a schematic diagram of the reader and the tag according to another embodiment in which the tag actively transmits the identification information.

FIG. 5 is a schematic diagram of the reader and the tag 132 of the student tracking system according to another embodiment of the present invention.

The reader 130 and tag 132 are similar to the embodiment depicted in FIG. 4.

Now, however, the tag 132 includes a controller 224, a wireless transmitter 220 and an antenna 222. The controller 224 directs the functionality of the tag 132 (e.g. by executing firmware/operating system instructions) and stores a device ID 226 uniquely associated with the tag 132, for example, via integrated memory of the controller 224. The wireless transmitter 220 transmits via the antenna 222 the identification information (e.g. device ID 226), for example, by continually wirelessly broadcasting the identification information or transmitting the identification information to the reader 130 in response to a wireless signal received from the reader 130. In different implementations, the reader 130 and tag 132 can communicate using various wireless technologies including Bluetooth Low Energy (BLE), standard Bluetooth, Wi-Fi (IEEE 802.11), active RFID, or ZigBee, to list a few examples.

In the illustrated embodiment, the tag 132 can be a mobile computing device such as a smart phone or tablet, or a beacon device, among other examples.

Figure 6:
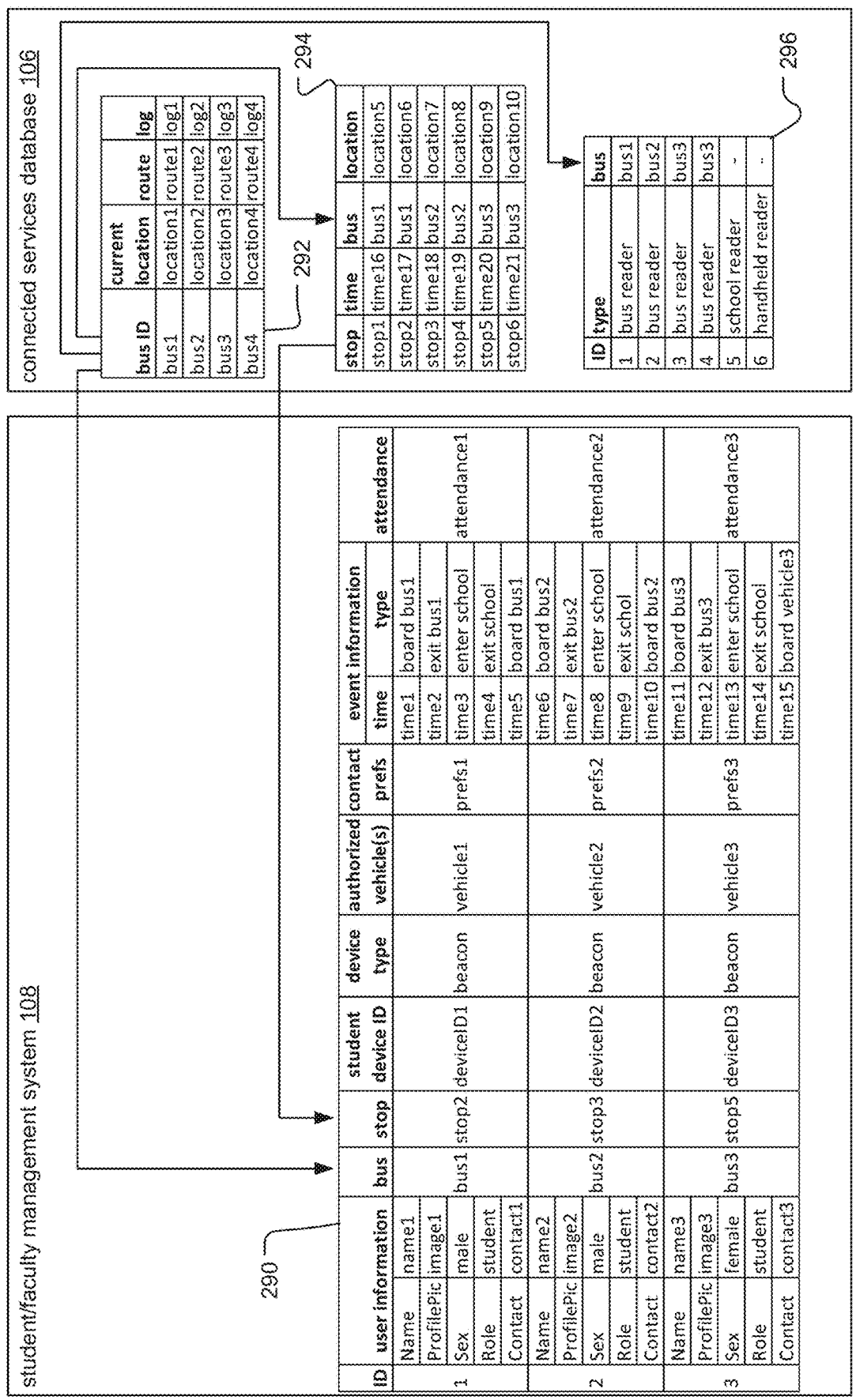
FIG. 6 is a diagram of an exemplary connected services database and student/faculty management system of the student tracking system.

FIG. 6 is a diagram showing an exemplary connected services database 106 and student/faculty management system 108.

The connected services database 106 includes a bus table 292, a stop table 294, and a device table 296.

The bus table 292, which maintains information associated the buses 107, includes columns for a bus ID, or unique identifier assigned to the bus 107, a current location, an assigned route, and a log. The current location includes location information indicating the most recent location of the bus 107. The location information might include coordinate information (e.g. GNSS/GPS coordinates indicating longitude and latitude) or address information, or references to known locations such as bus stops 105 or school buildings 113, among other examples. Further, the location information might have been generated by the bus reader 130-b or student reader 130-u, for example. The assigned route column includes route information indicating a prescribed route for the bus 107 to take during normal operation, including possible navigation information and/or instructions. This route information might refer to coordinate information or a sequence of bus stops 105, in examples. The log column includes a reference to historical travel logs for each bus 107. The logs might include time and date information paired with location information indicating where the bus 107 was previously located over a period of time.

In the illustrated example, the bus table 292 lists four different buses 107 with device IDs ranging from bus1 through bus4, each associated with a different location ranging from location1 to location 4, a different route ranging from route1 to route4, and a different log ranging from log1 to log4.

The stop table 294, which maintains information associated with bus stops 105, includes columns for a stop ID, or unique identifier assigned to the bus stop 105, a time, an assigned bus 107, and a location. The time column includes prescribed time information for each bus stop 105 indicating when the bus 107 is scheduled to stop at the particular bus stop 105. The bus column indicates which bus 107 is scheduled to stop at the bus stop 105 and refers to values from the bus ID column of the bus table 292. The location column includes location information indicating the location of the bus stop 105 (e.g. where the bus 107 is scheduled to stop and where the students 150 wait for the bus 107 and/or exit the bus 107).

In the illustrated example, the stop table 294 lists six different bus stops 105 with stop IDs ranging from stop1 through stop6, each associated with a different prescribed time ranging from time16 through time21, a different bus 107 ranging from bus1 through bus3, and a different location ranging from location5 through location 10.

The device table 296, which maintains information associated with devices of the student tracking system 100 and/or possibly devices from building management systems of the school premises 103, includes columns for a device ID, or unique identifier assigned to the device, a device type, and an assigned bus. The device type indicates the type of device (e.g. reader 130, tag 132, bus reader 130-*b*, school reader 130-*s*, handheld reader 130-*h*). The assigned bus column indicates the bus 107 (if any) where the device is stationed and refers to values from the bus ID column in the bus table 292. The assigned bus column pertains to the bus readers 130-*b* and provides a way to identify and locate the bus 107 based on identification information for the bus reader 130-*b*.

In the illustrated example, the device table 296 lists six different devices, specifically readers 130, with device IDs ranging from 1-6, each associated with a type of either "bus reader", "school reader", or "handheld reader", and a bus 107 ranging from bus1 through bus3 (or no value).

The student/faculty management system 108 includes a student table 290, which maintains information associated with different students 150. The student table 290 includes columns for student ID, or unique identifiers for each student 150, user information, assigned bus, assigned stop, student device ID, device type, authorized vehicles, contact preferences, event information, and attendance information. The user information includes basic information about the student including name, a profile picture, sex, role (e.g. student, faculty), and contact information (e.g. phone numbers for the student 150 and/or any responsible parties 162 associated with the student such as parents 162-1). The assigned bus column indicates which bus 107 transports the student 150 to and from the school premises 103 and refers to values from the bus ID column of the bus table 292. The assigned stop column indicates the bus stop 105 where the student 150 enters and exits the bus 107 and refers to values from the stop ID column of the stop table 294. The student device ID column includes identification information for any devices such as student readers 130-*u* and/or student tags 132-*u* associated with the student 150. The device type column includes information about the type of device identified in the student device ID column, such as whether the device is a beacon or smart phone of the student 150, among other examples. The authorized vehicles column includes identification information for any vehicle tags 132-*v* for authorized vehicles 123 associated with the student 150. The contact preferences column includes preferences information indicating whether and how responsible parties 162 such as parents 162-1 prefer to be notified by the student tacking system 100, such as whether they prefer to receive push notifications on a mobile application executing on the parent/teacher device 162 or text messages, among other examples. The event information column includes the event information for entering and exiting events involving the student 150, including time and date information and a type or descriptor of the event indicating whether the student 150 entered or exited and which bus 107 or school entrance/exit point 111 was used. Finally, the attendance column includes attendance information generated by the student tracking system 100 including, for example, a log of when the student 150 entered and exited the school building 113 as well as different classrooms within the school building 113.

Other tables (not illustrated) could also be included in the student/faculty management system 108 including tables for maintaining similar information as the student table 290 but for responsible parties 162 such as parents 162-1, bus drivers 162-2, school administrators 162-3 and/or faculty members 162-4, any other school employees, or any other individual for which the student tracking system 100 needs to maintain information.

In the illustrated example, the student table 290 lists three students 150 with different names, profile pictures, sexes, roles, and contact information. Each of the students 150 is associated with a different bus ID for a bus 107 ranging from bus1 through bus3, stop ID for a bus stop 105 ranging from stop2 through stop5, student device ID for a student reader 130-*u* or student tag 132-*u* ranging from deviceID1 through deviceID3, a type of "beacon", a different authorized vehicle ID for a vehicle tag 132-*v* ranging from vehicle1 through vehicle 3, different contact preferences ranging from prefs1 through prefs3, and attendance information ranging from attendance1 through attendance3. Similarly, each of the students 150 has an associated event information history, with timestamps ranging from time1 through time25 associated with event descriptors such as e.g. "board bus1", "exit bus1", "enter school", "exit school".

Figure 7:
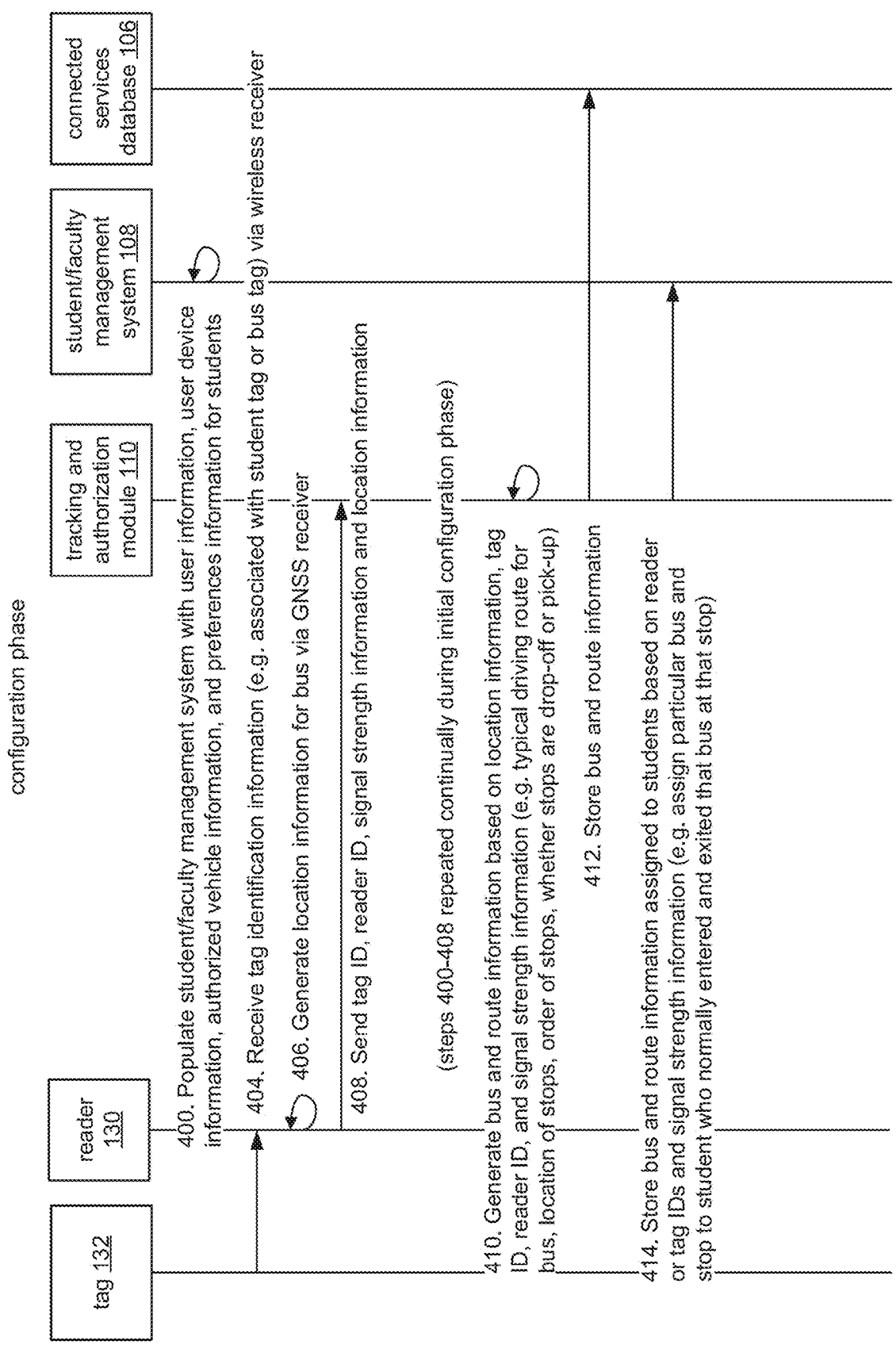
FIG. 7 is a sequence diagram illustrating an example of how the student tracking system generates bus and route information during a configuration phase.

FIG. 7 is a sequence diagram illustrating an example of how the student tracking system 100 generates bus and route information indicating which students 150 are assigned to which buses 107, and what routes the buses 107 typically travel, during a configuration phase.

First, in step 400, the student/faculty management system 108 is populated with student information, student device information, authorized vehicle information and preferences information for each of the students 150.

In step 404, the reader 130 receives tag identification information via the wireless receiver 221. According to the different configurations previously discussed, step 404 can include bus readers 130-*b* receiving tag identification information from student tags 132-*u* or student readers 130-*u* receiving tag identification information from bus tags 132-*b*.

In either case, in step 406, the reader 130 generates location information for the bus 107 via the GNSS receiver, and, in step 408, the reader 130 sends the tag identification information, reader identification information, signal strength information for the wireless signals transmitted by the tag 132 and received by the reader 130, and the location information to the tracking and authorization module 110.

Steps 400 through 408 repeat continually during the initial configuration phase, as the student tracking system 100 accumulates more and more information about the students 150, buses 107, bus stops 105, routes, and schedules.

In step 410, the tracking and authorization module 110 generates bus and route information based on the location information, tag identification information, reader identification information and signal strength information. In one example, the bus and route information includes the typical driving route for each bus 107, location information for each bus stop 105, sequence information for the bus stops 105 (e.g. order of stops), and whether the bus 107 picks up or drops off the students 150 at the stops 105 at certain times, among other examples. The tracking and authorization module 110 stores this bus and route information the connected services database 106 in step 412, for example, in the bus table 292 and/or stop table 294.

Additionally, in step 414, the tracking and authorization module 110 stores the bus and route information associated with each student 150 in the student/faculty management system 108 based on the reader and/or tag identification information and the signal strength information. For example, the tracking and authorization module 110 assigns buses 107 and bus stops 105 to each student 105 based on whether the students 150 normally entered and exited the buses 107 at the bus stops 105 and then stores the assigned bus and stop information to the student/faculty management system 108 associated with the students 150.

Figure 8:
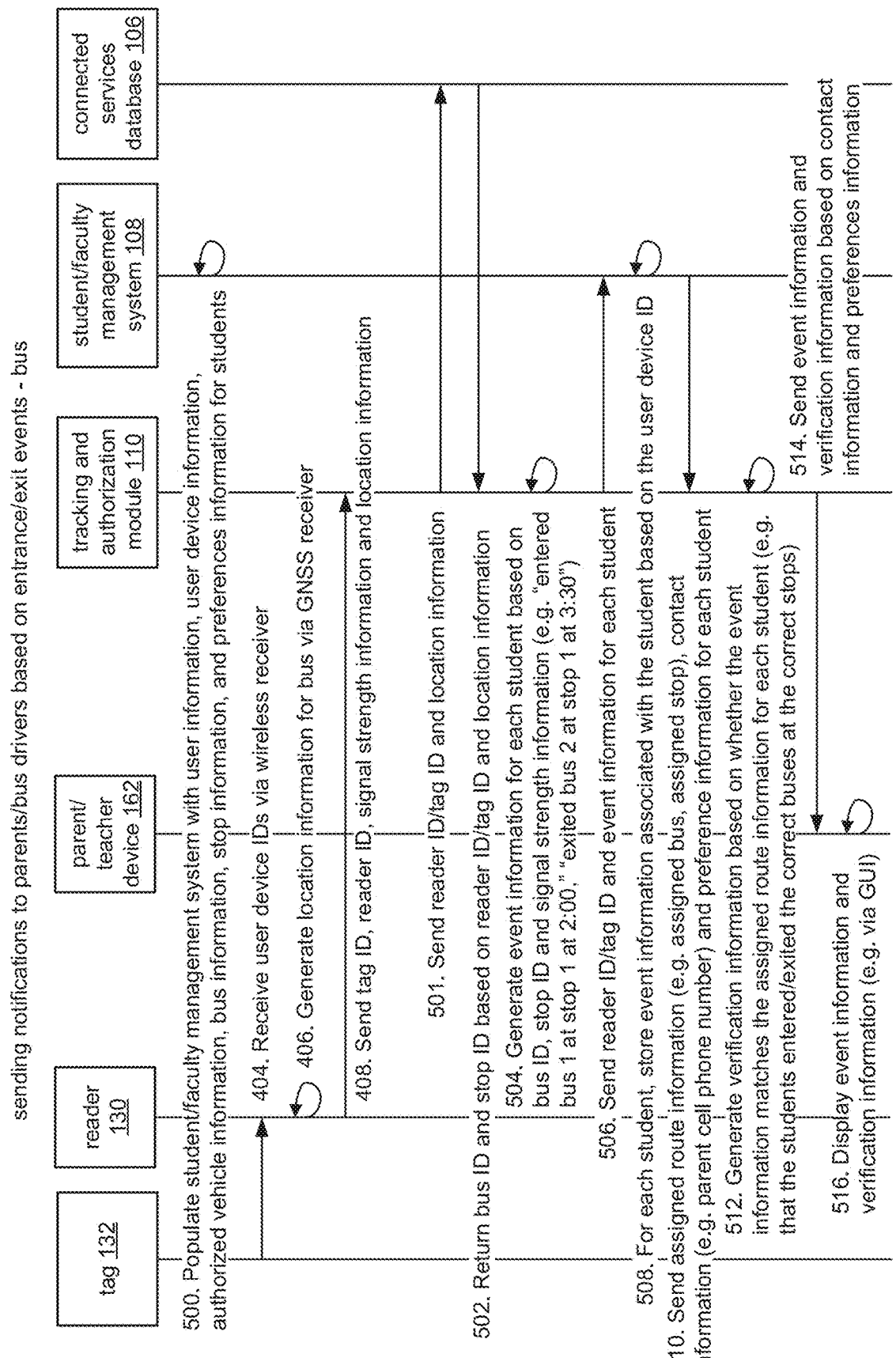
FIG. 8 is a sequence diagram illustrating an example of how the student tracking system generates and sends to parent/teacher devices event information for entering and exiting events at a bus entrance/exit point.

FIG. 8 is a sequence diagram illustrating an example of how the student tracking system 100 generates and sends event information to the parent/teacher devices 162.

First, in step 500, the student/faculty management system 108 is populated with student information, student device information, authorized vehicle information, bus information, stop information and preferences information. In one example, the bus and stop information is populated based on the process described in the previously described steps 400 through 414.

Steps 404 through 408 proceed as previously described, as the readers 130 receive tag identification information from the tags 132, generate the location information, and send the reader and tag identification information, signal strength information and location information to the tracking and authorization module 110.

In step 501, the tracking and authorization module 110 sends the reader identification information or the tag identification information (based on the current configuration of the student tracking system 100 and whether the reader 130 or the tag 132 is stationed on the bus 107 and thus which of the reader or tag identification information is associated with the bus 107 as opposed to the student 150) and location information to the connected services database 106, which, in step 502, returns the bus ID and stop ID associated with the reader/tag identification information and location information respectively. In this way, the tracking and authorization module 110 identifies which buses 107 and bus stops 105 are associated with the entering and exiting events.

In step 504, the tracking and authorization module generates the event information for the entering and exiting events for each student 150 based on the bus ID, stop ID and signal strength information as well as the reader/tag identification information (depending on which is associated with the student 150 according to the current configuration of the student tracking system 100). In examples, the tracking and authorization module determines that a student 150 associated with tag ID deviceID1 entered bus1 at stop1 at 2:00, or a student associated with reader ID deviceID2 exited bus2 at stop1 at 3:30.

In step 506, the tracking and authorization module 110 sends the reader/tag identification information and the event information to the student/faculty management system 108.

In step 508, the student/faculty management system 108 stores the event information for each student 150 based on the reader/tag identification information (e.g. by storing the event information associated with the reader/tag identification information for the student 150 associated with matching reader/tag identification information).

In step 510, the student/faculty management system 108 returns assigned route information (e.g. assigned bus 107 and assigned bus stop 105), contact information (e.g. cell phone number for parent 162-1) and preference information for each student 150 involved in the entering and exiting events indicated in the event information.

In step 512, the tracking and authorization module 110 generates verification information based on whether the event information matches the assigned route information for each student 150 (e.g. whether the students 150 entered/exited the correct buses 107 at the correct stops 105).

In step 514, the tracking and authorization module 110 sends the event information and verification information to the parent/teacher devices 162 based on the contact information and preference information for each student 150.

Finally, in step 516, the parent/teacher devices 162 present the event information and contact information to the responsible parties 160, for example, via a mobile application rendering a graphical user interface 124 on the display of the parent/teacher device 162.

Figure 9:
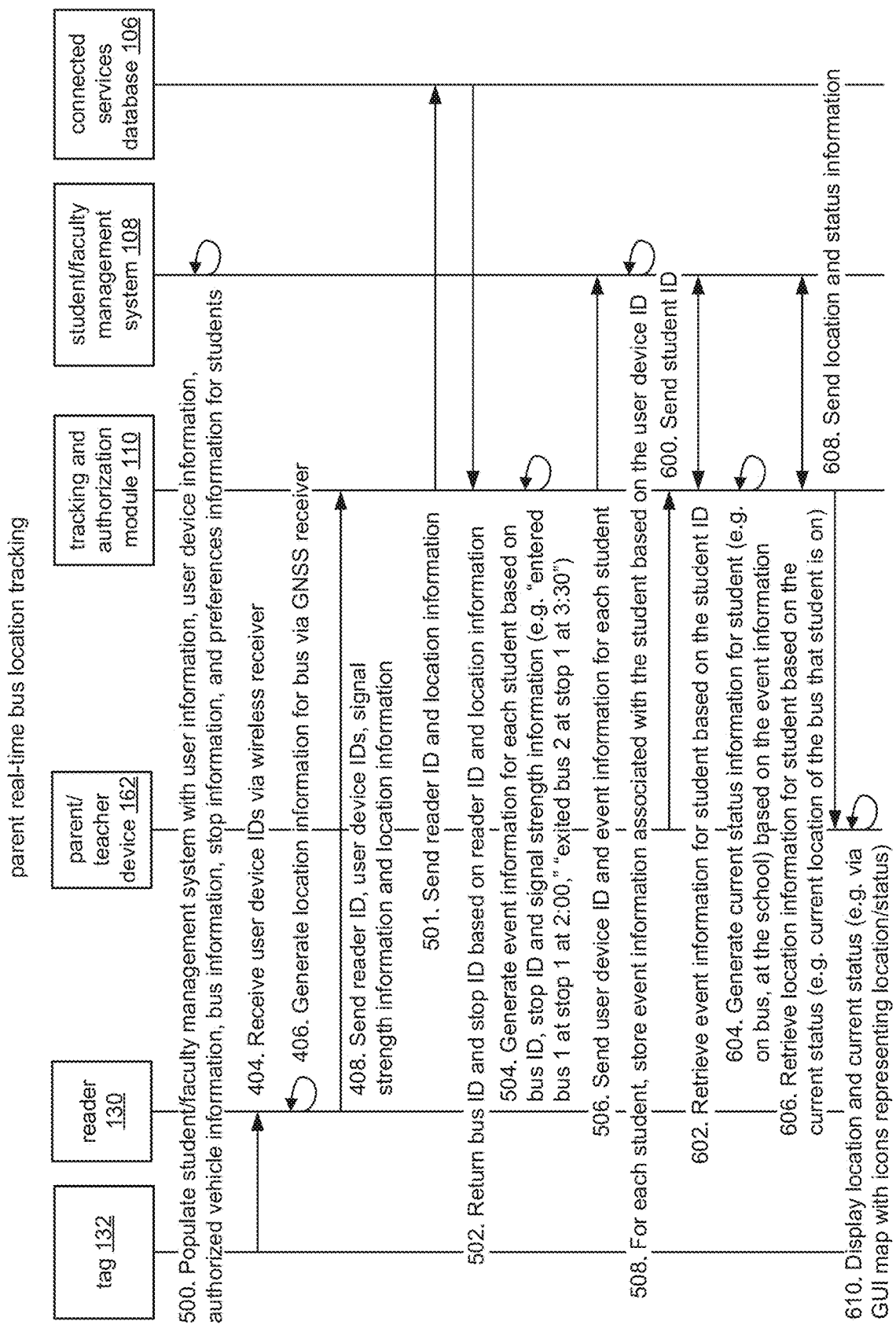
FIG. 9 is a sequence diagram illustrating an example of how the student tracking system provides real-time location tracking of the students.

FIG. 9 is a sequence diagram illustrating an example of how the student tracking system 100 provides real-time location tracking of the students 150.

First, steps 500, 404 through 408, and 501 through 508 proceed as previously described, as the student tracking system 100 generates and stores the event information for each student 150.

In step 600, the parent/teacher device 162 sends identification information for a particular student 150 to the tracking and authorization module 110, which, in step 602 retrieves the event information for the student 150 from the student/faculty management system 108 based on the student identification information.

In step 604, the tracking and authorization module 110 generates current status information for the student 150 (e.g. whether the student is on the bus 107, on inside the school building 113) based on the event information.

In step 606, the tracking and authorization module 110 retrieves location information for the student 150 based on the current status information (e.g. by retrieving the current location information for the bus 107 that the student 150 is determined to be on).

In step 608, the tracking and authorization module 110 sends the location information and the status information to the parent/teacher devices 162, which, in step 610 present the location and current status information to the responsible parties 160 (e.g. via a graphical user interface 124 including a map with graphical elements or icons overlaid on the map representing the location and status information.

Figure 10:
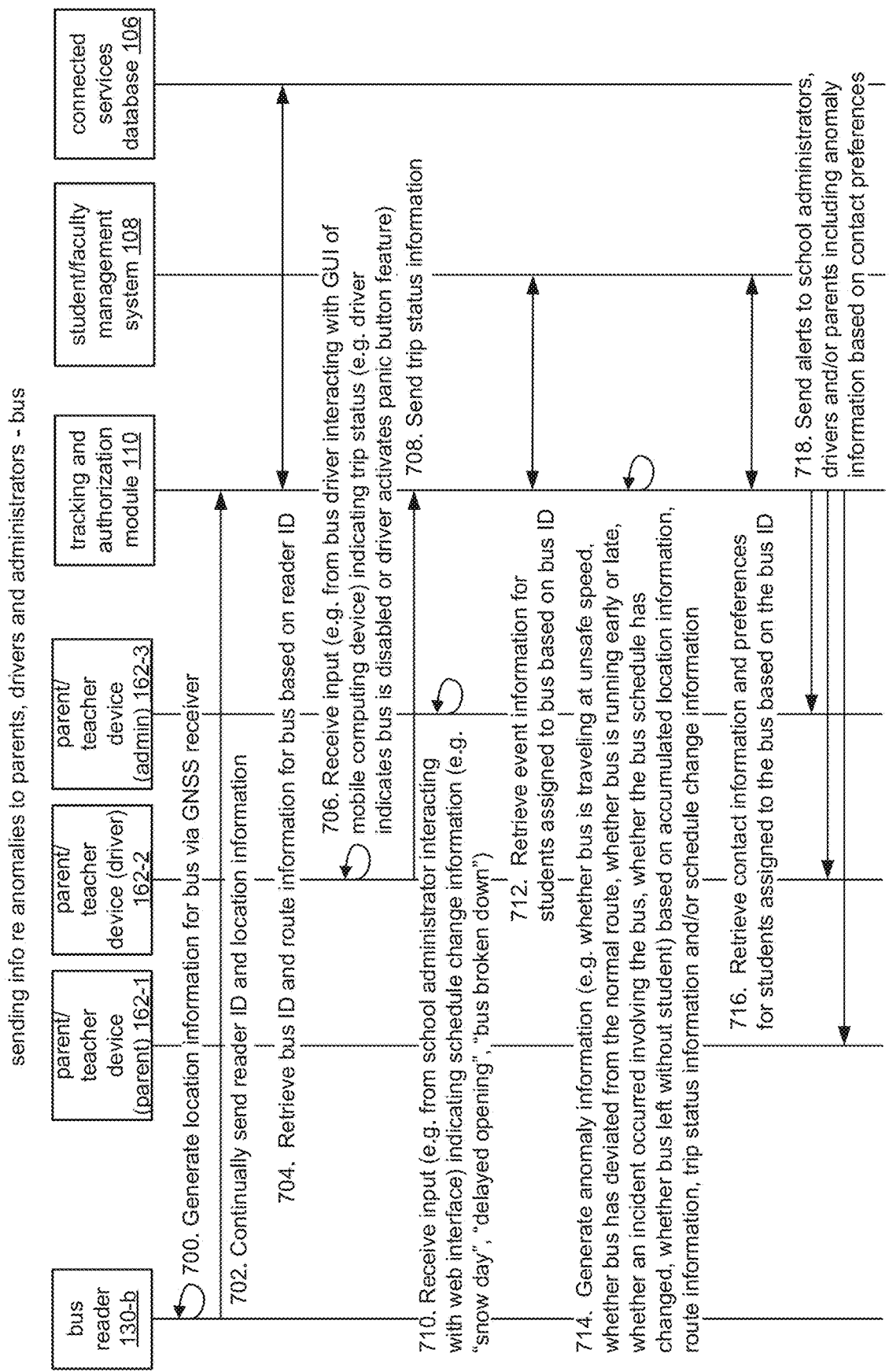
FIG. 10 is a sequence diagram illustrating an example of how the student tracking system generates and sends anomaly information to the parent/teacher devices.

FIG. 10 is a sequence diagram illustrating an example of how the student tracking system 100 detects anomalies and provides anomaly information to responsible parties 160.

First, in step 700, the bus reader 130-b stationed on the bus 107 generates location information for the bus 107 via the GNSS receiver 230. The bus reader 130-b continually sends this location information along with its reader identification information to the tracking and authorization module 110 in step 702.

In step 704, the tracking and authorization module 110 retrieves from the connected services database 106 the bus ID and route information for the bus 107 based on the reader identification information received from the bus reader 130-b stationed on the bus 107.

In step 706, the parent/teacher device 162-2 operated by the bus driver 160-2 receives input indicating trip status information. In one example, the bus driver 160-2 interacts with the graphical user interface 124-2 of the parent/teacher device 162-2 to enter information that the bus 107 is disabled. In another example, the bus driver 160-2 activates a panic button feature of the parent/teacher device 162-2. The parent/teacher device 162-2 operated by the bus driver 160-2 sends the trip status information to the authorization and tracking module 110 in step 708.

In step 710, the parent/teacher device 162-3 operated by the school administrator 160-3 receives input indicating schedule change information. In one example, the school administrator 160-3 interacts with a web interface presented on a display of the parent/teacher device 162-3 in order to enter the schedule change information resulting from the disabled bus. In other examples, the schedule change information might concern inclement weather closures or delayed openings.

In step 712, the tracking and authorization module 110 retrieves form the student/faculty management system 108 the event information for the students 150 assigned to the bus 107 based on the bus ID.

In step 714, the tracking and authorization module 110 generates anomaly information based on accumulated location information, route information, trip status information and/or schedule information associated with the bus 107 and/or particular students 150. In one example, the tracking and authorization module 110 determines that the bus 107 is running late, for example, due to an incident that occurred involving the bus 107. In other examples, the tracking and authorization module 110 generates anomaly information indicating that the bus 107 is running early, the bus 107 is traveling at unsafe speeds, the bus 107 has deviated from its normal route, whether the bus schedule has changed, and/or whether the bus 107 has left a bus stop 105 without a student 150 assigned to the bus 107 having entered.

In step 716, the tracking and authorization module 110 retrieves from the student/faculty management system 108 contact information and preference information for the students 150 assigned to the bus 107 based on the bus ID. The tracking and authorization module 110, in step 718, then sends alerts including the anomaly information to the responsible parties 160 including the school administrators 160-3, bus drivers 160-2 and/or parents 160-1 based on the contact preferences for the students 150.

Figure 11:
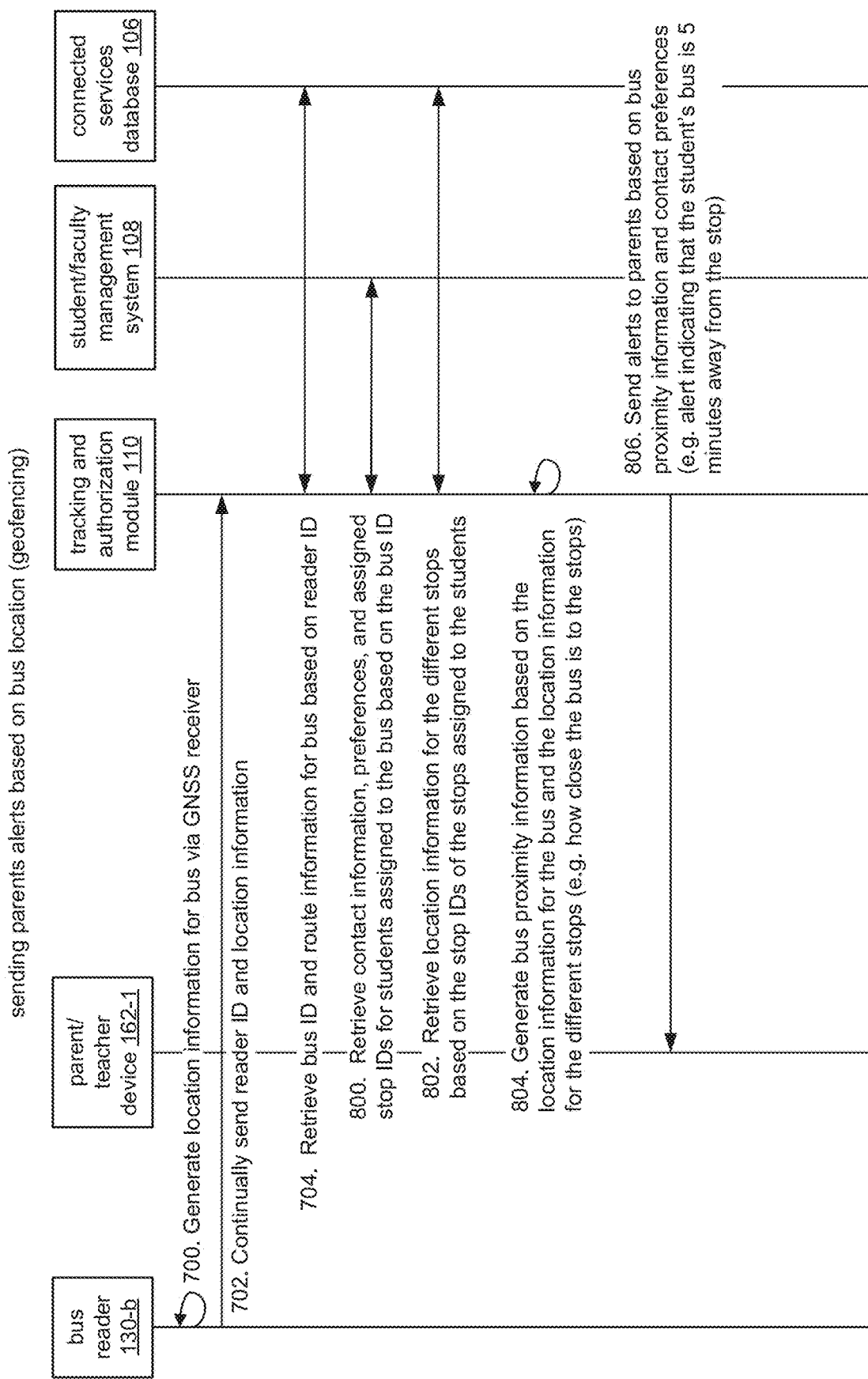
FIG. 11 is a sequence diagram illustrating an example of how the student tracking system uses geofencing to alert parents when the buses are nearing assigned bus stops for the students.

FIG. 11 is a sequence diagram illustrating an example of how the student tracking system 100 uses geofencing to alert parents 160-1 when the bus 107 is nearing the student's 150 assigned bus stop 105.

Steps 700 through 704 proceed as previously described, as the bus reader 130-*b* continually generates and sends location information to the tracking and authorization module 110, and the tracking and authorization module 110 retrieves the bus ID and route information for the bus based on the bus reader 130-*b* identification information.

In step 800, the tracking and authorization module 110 retrieves from the student/faculty management system 108 contact information, preference information, and stop IDs for assigned stops 105 for all of the students 150 assigned to the bus 107 based on the bus ID. The tracking and authorization module 110 further retrieves location information for the different stops 105 based on the stop IDs of the stops 105 assigned to the students 150.

In step 804, the tracking and authorization module 110 generates bus proximity information indicating the location of the bus with respect to the location of the assigned bus stops 105.

Finally, in step 806, the tracking and authorization module 110 sends alerts to the parent/teacher devices 162-1 operated by the parents 160-1 based on the bus proximity information and preference information for each student 150. In one example, the alert indicates that the student's 150 bus 107 is five minutes away from the student's 150 assigned bus stop 105.

Figure 12:
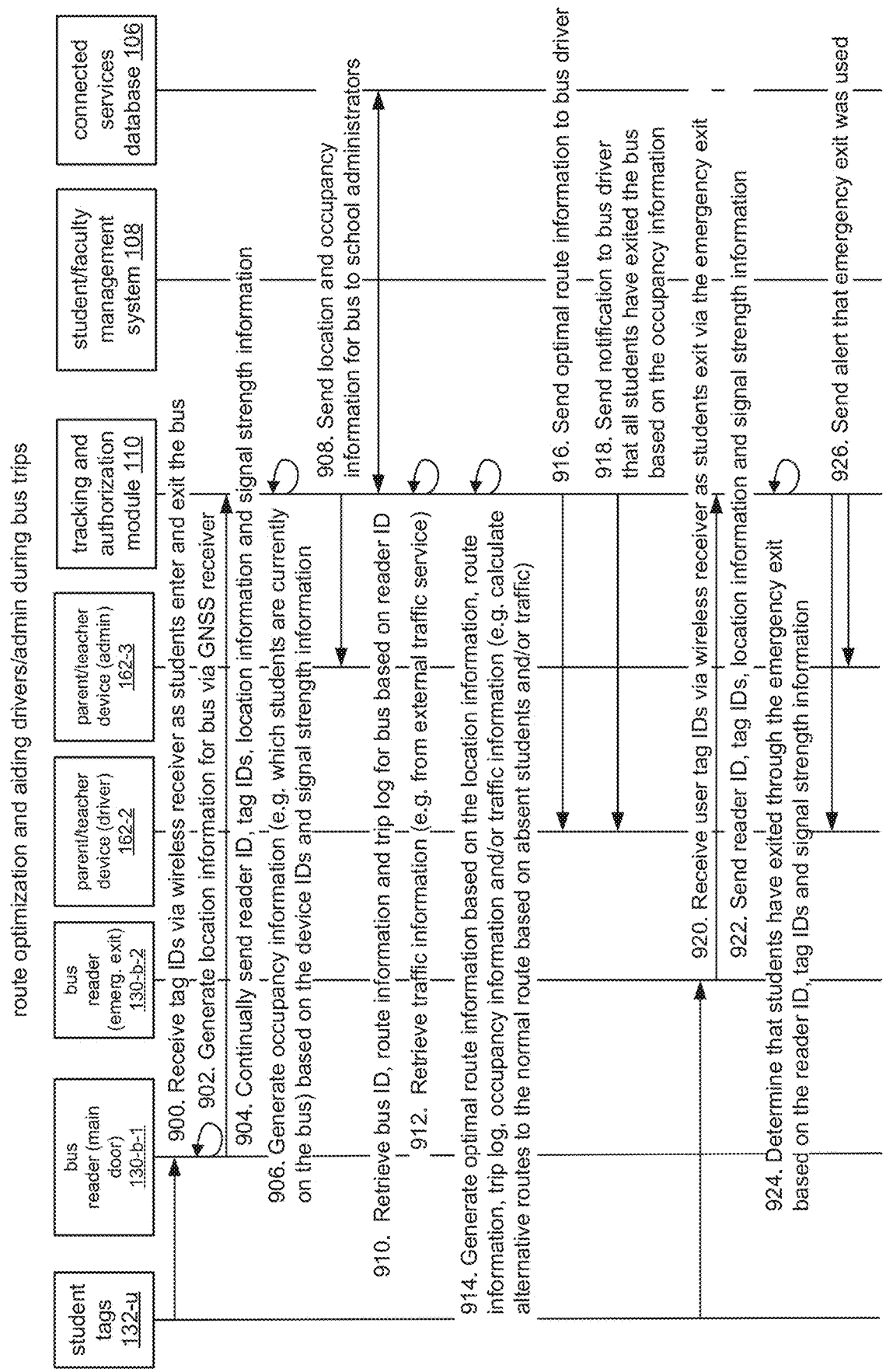
FIG. 12 is a sequence diagram illustrating an example of how the student tracking system generates optimal route information and provides trip and occupancy information to bus drivers and school administrators while the buses are in transit.

FIG. 12 is a sequence diagram illustrating an example of how the student tracking system 100 generates optimal route information and provides information to bus drivers 160-2 and school administrators 160-3 while the buses 107 are in transit.

In step 900, the bus reader 130-*b*-1 stationed at the bus entrance/exit point 109 (e.g. the main passenger door) receives tag identification information from the student tags 132-*u* as the students 150 enter and exit the bus 107 during the entering and exiting events.

In step 902, the bus reader 130-*b*-1 generates location information for the bus 107 via the GNSS receiver 230, and, in step 904, the bus reader 130-*b*-1 continually sends its own reader identification information, tag identification information received from student tags 132-*u*, location information and signal strength information to the tracking and authorization module 110.

In step 906, the tracking and authorization module 110 generates occupancy information (e.g. indicating which students 150 are currently on the buses 107) based on the reader and tag identification information and the signal strength information. In step 908, the tracking and authorization module 110 sends the location and occupancy information for the buses 107 to the parent/teacher devices 162-3 operated by the school administrator 160-3.

In step 910, the tracking and authorization module 110 retrieves the bus ID, route information and trip logs for the buses 107 based on the reader identification information from the bus readers 130-*b*-1. Additionally, in step 912, the tracking and authorization module 110 retrieves traffic information (e.g. from an external traffic and/or navigation service).

In step 914, the tracking and authorization module 110 generates optimal route information based on the location information, route information, trip log, occupancy information and/or traffic information. The optimal route information might indicate alternative routes than the bus's 107 normal route based on absent students 150 and/or heavy traffic, among other examples.

In step 916, the tracking and authorization module 110 sends the optimal route information to the parent/teacher device 162-2 operated by the bus driver 160-2.

In step 918, the tracking and authorization module 110 further sends notifications to the parent/teacher device 162-2 operated by the bus driver 160-2 based on the occupancy information (e.g. indicating that all students 150 have exited the bus 107).

In step 920, the bus reader 130-*b*-2 stationed at the emergency exit 109-*e* of the bus 107 receives tag identification information from student tags 132-*u* while students 150 are exiting the bus 107 through the emergency exit 109-*e*. In step 922, the bus reader 130-*b*-2 sends its own reader identification information, tag identification information received from the student tags 132-*u*, location information and signal strength information to the tracking and authorization module 110.

In step 924, the tracking and authorization module 110 determines that students 150 have exited the bus 107 through the emergency exit 109-*e* based on the reader and tag identification information and signal strength information. The tracking and authorization module 110, in step 926, then sends an alert to the parent/teacher devices 1622 operated, for example, by the bus driver 160-2 and the school administrator 160-3 indicating that the emergency exit 109-*e* was engaged.

Figure 13:
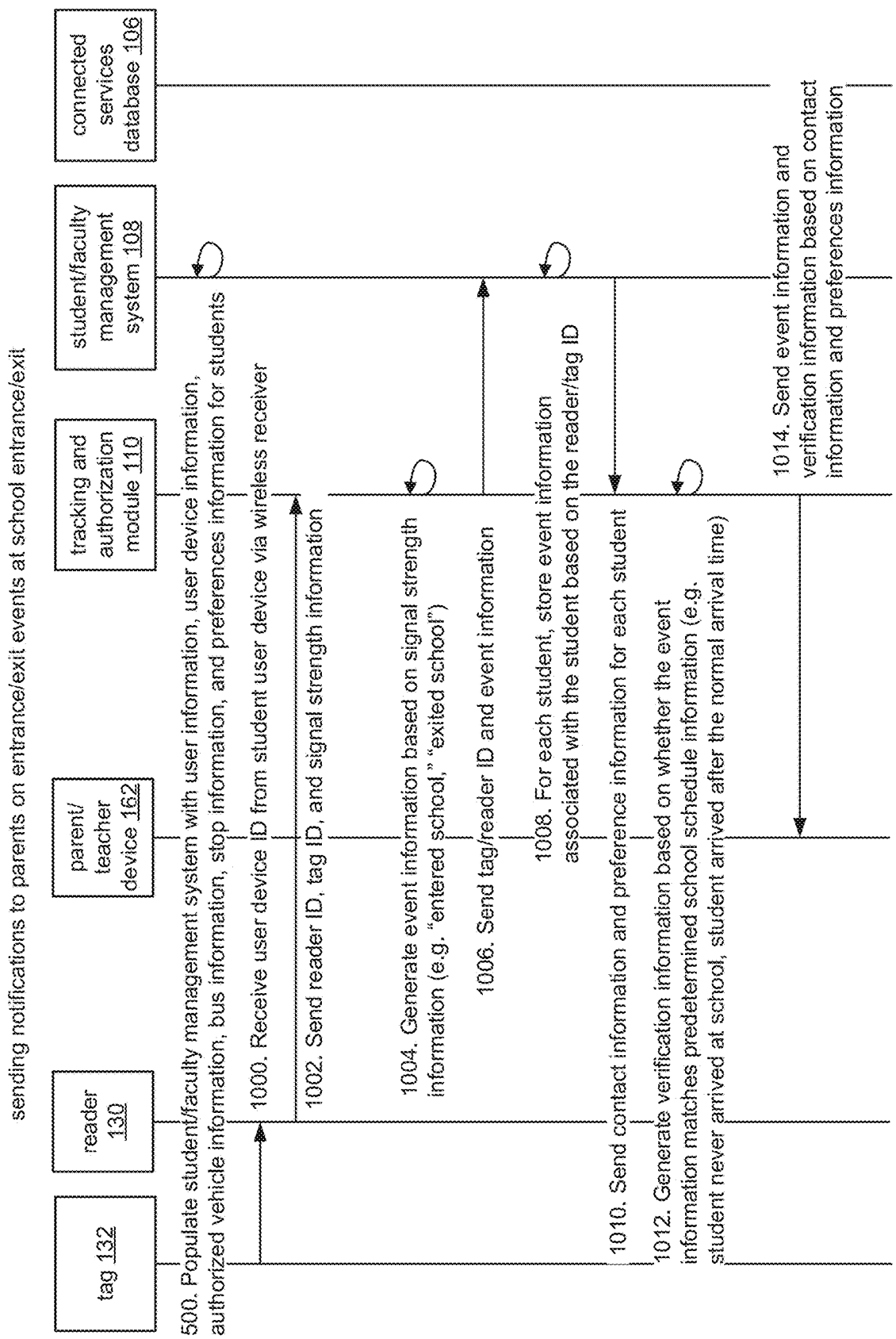
FIG. 13 is a sequence diagram illustrating an example of how the student tracking system generates the event information based on entering and exiting events at a school entrance/exit point of a school building.

FIG. 13 is a sequence diagram illustrating an example of how the student tracking system 100 generates the event information based on entering and exiting events at the school entrance/exit point 111 of the school building 113.

Step 500 proceeds as previously described, as the student/faculty management system 108 is populated with student, student device, authorized vehicle, bus, stop and preference information.

In step 1000, the reader 130 receives tag identification information via the wireless receiver 221 from the tags 132. According to the different configurations previously discussed, step 1000 can include school readers 130-*s* receiving tag identification information from student tags 132-*u* or student readers 130-*u* receiving tag identification information from school tags 132-*s*.

In either case, in step 1002, the reader 130 sends its own reader identification information, the tag identification information received from the tag 132, and signal strength information for the wireless signals transmitted by the tag 132 and received by the reader 130 to the tracking and authorization module 110.

In step 1004, the tracking and authorization module 110 generates the event information based on the signal strength information. In examples, the event information might indicate that the students 150 entered or exited the school building 113 at certain times.

In step 1006, the tracking and authorization module 110 sends to the student/faculty management system 108 either the tag identification information or the reader identification information (depending upon the current configuration of the student tracking system 100 and which identification information is associated with the students 150) and the event information. In step 1008, the student/faculty management system 108 stores the event information based on the reader/tag identification information matching the readers 130 or tags 132 associated with the students 150, and, in step 1010, the student/faculty management system 108 returns the contact information and preference information for each student 150 based on the reader/tag identification information.

In step 1012, the tracking and authorization module 110 generates verification information based on whether the event information matches predetermined school schedule information (e.g. by determining that students 150 did not enter the school building 113 by a predetermined time, or that students 150 arrived later, after the predetermined time).

Finally, in step 1014, the tracking and authorization module 110 sends the event information and verification information based on the contact information and preference information for each student to the parent/teacher devices 162.

Figure 14:
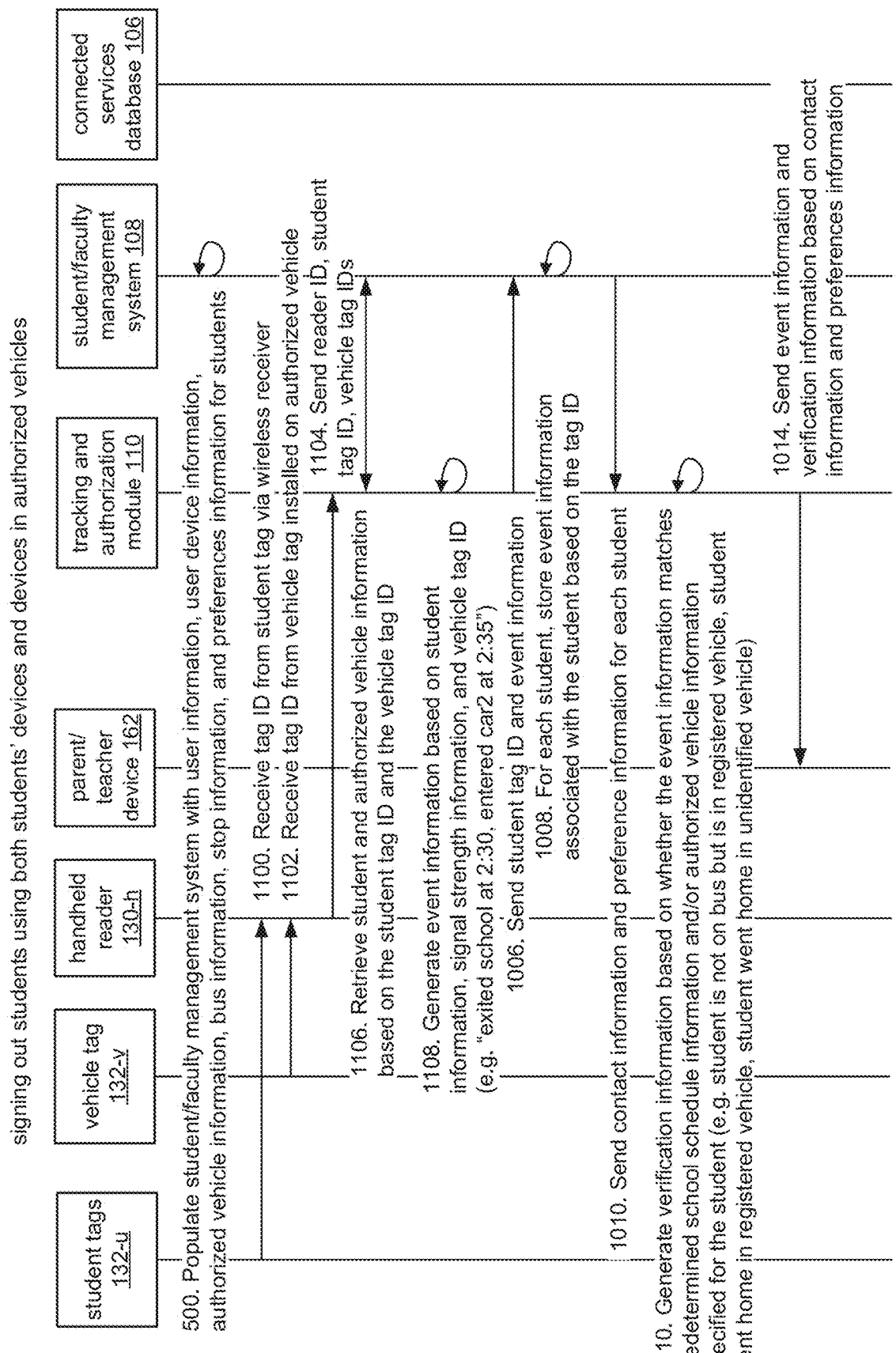
FIG. 14 is a sequence diagram illustrating an example of how the student tracking system confirms whether students exiting the school building and/or the school premises leave in authorized vehicles associated with the students.

FIG. 14 is a sequence diagram illustrating an example of how the student tracking system 100 confirms whether students 150 exiting the school building 113 and/or the school premises 103 are leaving in an authorized vehicle 123 associated with the student 150.

Step 500 proceeds as previously described.

Now, however, in step 1100, the handheld reader 130-*h* (e.g. operated by a faculty member 160-4) receives tag identification information from the student tags 132-*u*. Similarly, in step 1102, the handheld reader 130-*h* receives tag identification information from the vehicle tags 132-*v* installed on the authorized vehicles 123 for the students 150. For example, a faculty member 160-4 walks the student 150 out to the authorized vehicle 123 and uses the handheld reader 130-*h* to scan the student tag 132-*u* and the vehicle tag 132-*v*.

In step 1104, the handheld reader 130-*h* sends its own reader identification information along with the student tag identification information received from the student tags 132-*u* and the vehicle tag identification information received from the vehicle tags 132-*v* to the tracking and authorization module 110.

In step 1106, the tracking and authorization module 110 retrieves student information and authorized vehicle information from the student/faculty management system 108 based on the student tag identification information and the vehicle tag identification information (e.g. by retrieving the information for students 150 associated with student tags 132-*u* with tag identification information matching the student tag identification information received from the handheld reader 130-*h*).

In step 1108, the tracking and authorization module 110 generates event information based on the student information, signal strength information and vehicle tag identification information. For example, the event information might indicate that a student 150 left the school premises 103 at 2:35 in a vehicle 123 identified as "car2".

Steps 1006 through 1010 proceed as previously described.

Now, however, in step 1110, the tracking and authorization module 110 generates the verification information based on whether the event information matches the authorized vehicle information for the students 150 in addition to whether the event information matches the predetermined school schedule information. For example, the verification information might indicate that the student 150 is not on their assigned bus 107 but left in an authorized vehicle 123 instead, or that the student 150 left the school premise 103 in an unidentified vehicle.

Finally, step 1014 proceeds as previously described, as the event information and verification information is sent to the parent/teacher devices 162.

Figure 15:
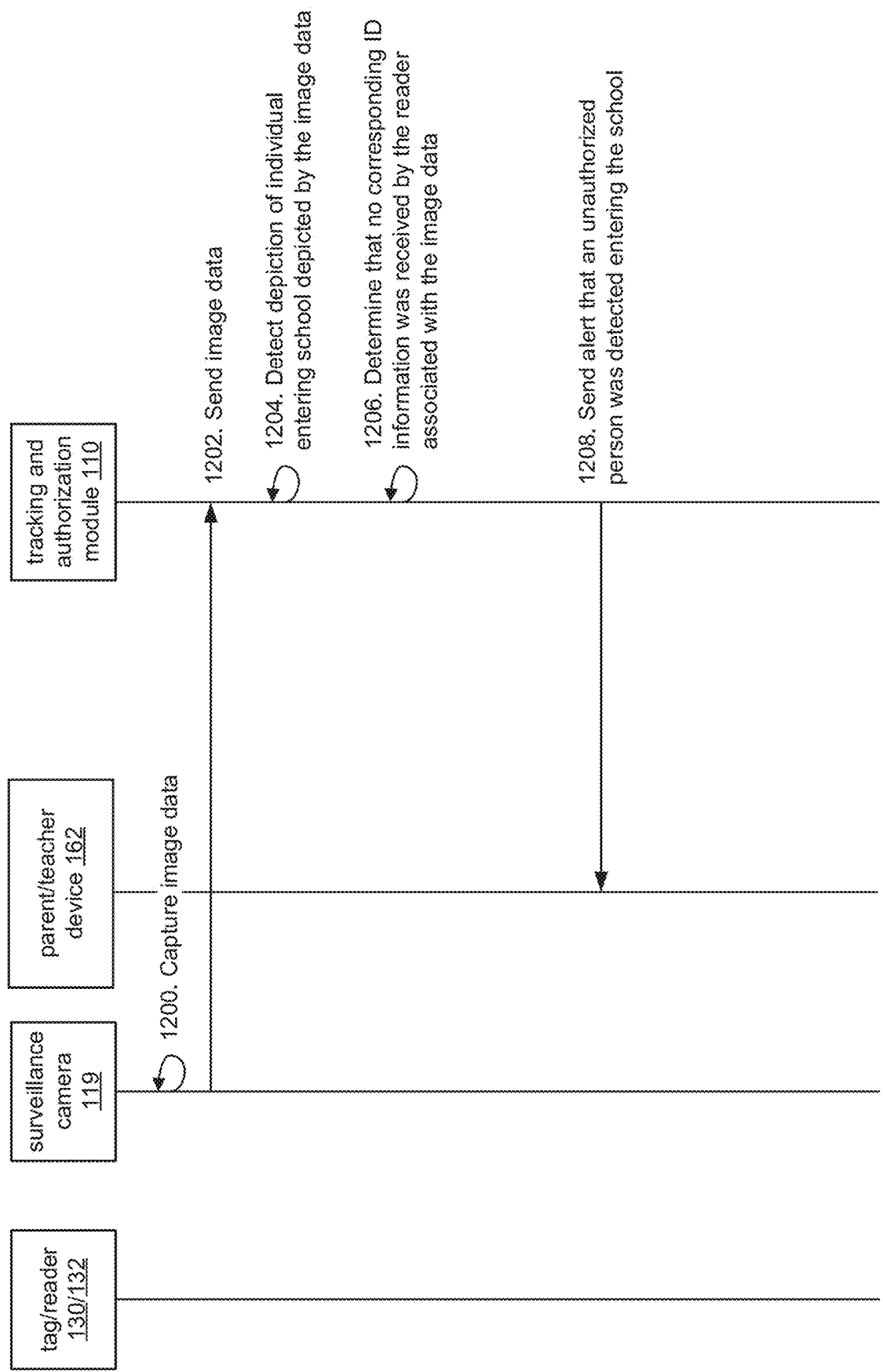
FIG. 15 is a sequence diagram illustrating an example of how the student tracking system detects unauthorized individuals entering the school building.

FIG. 15 is a sequence diagram illustrating an example of how the student tracking system 100 detects unauthorized individuals by comparing entering and exiting events detected based on image data captured by the surveillance camera 119 to entering and exiting events detected based on identification information received from the readers 130 and tags 132.

First, in step 1200, the surveillance camera 119 captures image data depicting entering and exiting events at the school entrance/exit point 111 and, in step 1202, sends the image data to the tracking and authorization module 110.

In step 1204, the tracking and authorization module 110 analyzes the image data and determines that an entering or exiting event has occurred (e.g. based on detecting a depiction of an individual entering the school building 113).

On the other hand, in step 1206, the tracking and authorization module 110 determines that no corresponding identification information from any readers 130 or tags 132 was received to be associated with the entering and exiting event depicted in the image data.

In step 1208, the tracking and authorization module 110 sends an alert to the parent/teacher devices 162 indicating that an unauthorized individual was detected entering the school building 113.

Figure 16:
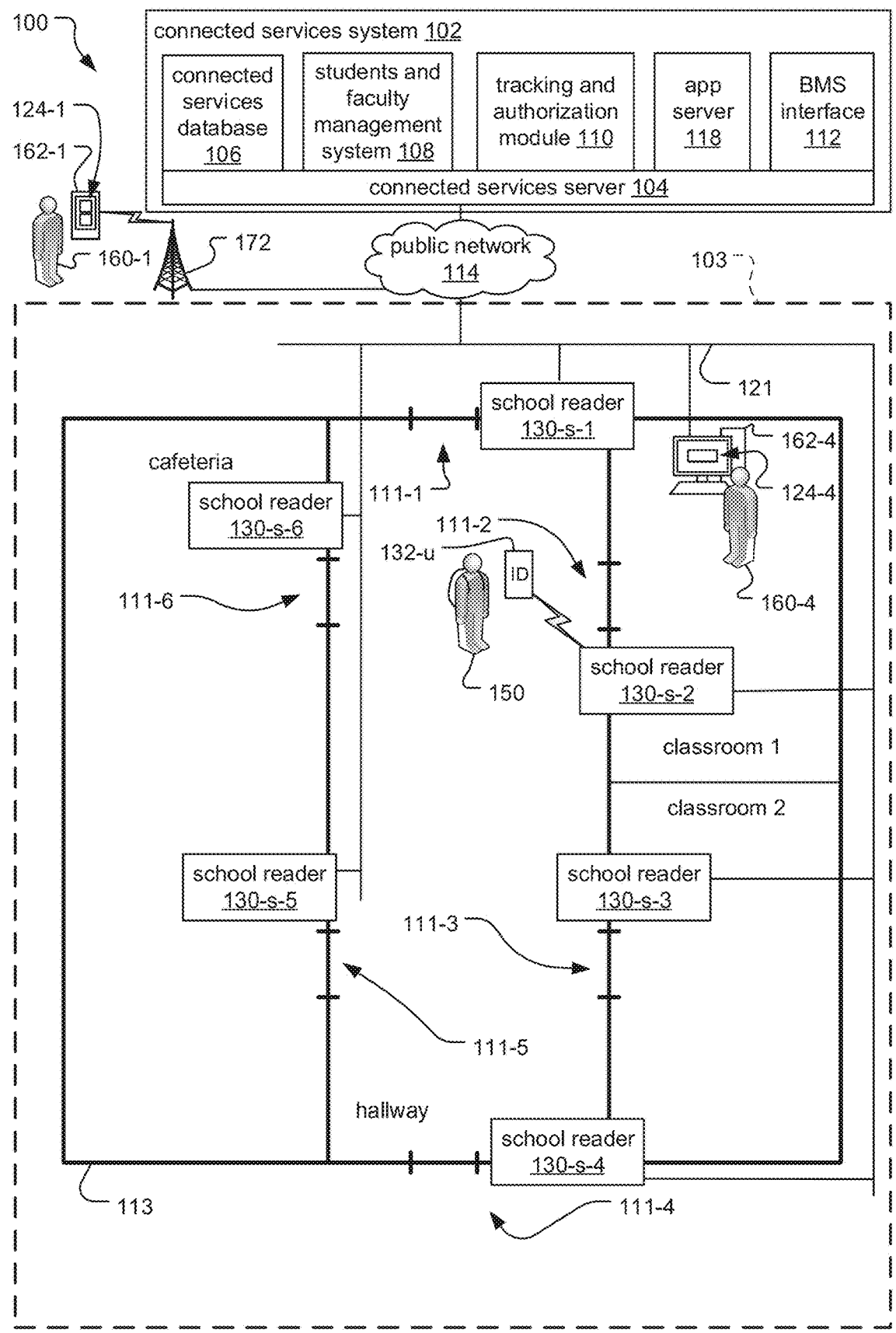
FIG. 16 is a schematic diagram of the student tracking system according to another embodiment in which school readers stationed at interior entrance/exit points of the school building receive identification information from the student tags.

FIG. 16 is a schematic diagram of the student tracking system 100 according to another embodiment of the present invention.

Here, the student tracking system 100 is similar to the previously described embodiments. Now, however, several school readers 130-*s* are stationed at school entrance/exit points 111 throughout the school, including entrances/exits to the school building 113 as well as to interior rooms and areas of the school building 113 such as hallways, cafeterias, and classrooms, among other examples.

The school readers 130-*s* read the tag identification information from student tags 132-*u* as they enter and exit classrooms through the school entrance/exit points 111. As before, the school readers 130-*s* send the tag identification information to the tracking and authorization module 110, which generates event information. Additionally, the tracking and authorization module 110 generates attendance information based on the event information as well as predetermined school schedule information (including class schedule information for each student 150).

The tracking and authorization module 110 sends the event information and/or the attendance information to the parent/teacher devices 162, including parent teacher devices 162-4 operated by faculty members 160-4 of the school.

In the illustrated example, a student 150 presents a student tag 132-*u* to be read by the school reader 130-*s*-2 stationed at the school entrance/exit point 111-2 leading to classroom 2, and the school reader 132-*s*-2 reads the tag identification information from the student tag 132-*u*.

Figure 17:
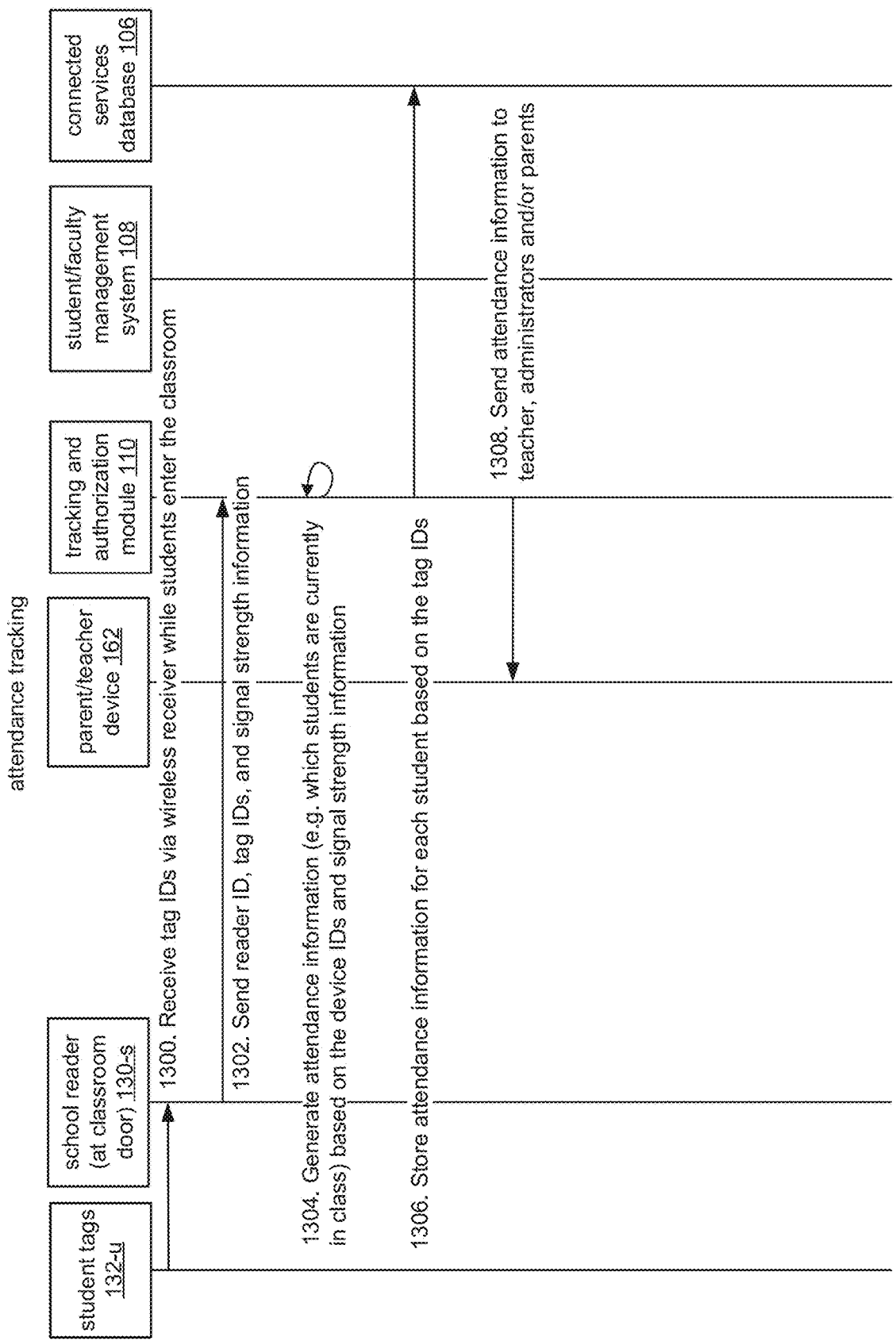
FIG. 17 is a sequence diagram illustrating an example of how the student tracking system generates attendance information for the students.

FIG. 17 is a sequence diagram illustrating an example of how the student tracking system 100 generates attendance information for the students 150.

In step 1300, the school reader 130-*s* stationed at the school entrance/exit point 111 of a classroom receives tag identification information from student tags 132-*u* during entering and exiting events in which the students 150 enter and exit the classroom.

In step 1302, the school reader 130-*s* sends its own reader identification information, the tag identification information received from the student tags 132-*u* and signal strength information to the tracking and authorization module 110.

In step 1304, the tracking and authorization module 110 generates attendance information based on the reader and tag identification information and the signal strength information. In one example, the attendance information indicates which students are currently in the classroom, whether a particular student is in the classroom, or a historical attendance log covering a predetermined period of time for one or more students 150.

In step 1306, the tracking and authorization module 110 stores in the student/faculty management system 108 the attendance information for each student 150 based on the tag identification information received from the student tags 132-*u*.

Finally, in step 1308, the tracking and authorization module 110 sends the attendance information to the parent/teacher devices 162 operated by the responsible parties 160, including the parents 160-1, school administrators 160-3 and/or faculty members 160-4.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for tracking students of schools, the system comprising:
    readers comprising wireless receivers for receiving identification information from tags during entering and exiting events of the students; and
    a tracking and authorization module for generating event information for the entering and exiting events based on the identification information received by the readers and sending the event information to parent/teacher devices,
    wherein the readers or the tags are installed on buses for transporting the students to and from the schools, and the exiting and entering events represent instances of the students entering and exiting the school buses and
    wherein the tracking and authorization module generates verification information based on the event information and stored bus and route information for the students and sends the verification information to the parent/teacher devices.

2. The system as claimed in claim 1, wherein readers stationed at the schools or on buses for transporting the students to and from the schools receive identification information associated with the students from mobile computing devices, wearable beacons and/or identification badges of the students.

3. The system as claimed in claim 1, wherein readers of the students receive identification information associated with buses for transporting the students to and from the schools from tags stationed on the buses.

4. The system as claimed in claim 1, wherein readers of the students receive identification information associated with areas of the schools from tags stationed at the areas of the schools.

5. The system as claimed in claim 1, wherein the tags comprise wireless transmitters and/or passive radio-frequency identification tags for sending the identification information.

6. The system as claimed in claim 1, wherein mobile applications executing on the parent/teacher device render graphical user interfaces on displays of the parent/teacher devices, and parent/teacher devices display the event information via the graphical user interfaces.

7. The system as claimed in claim 1, wherein the parent/teacher devices are operated by parents of the students, teachers, school administrators, bus drivers and/or security personnel of the schools.

8. The system as claimed in claim 1, wherein the readers comprise global navigation satellite system (GNSS) receivers and generate location information for the buses based on GNSS data received by the GNSS receivers, and the tracking and authorization module receives the location information and sends the location information to the parent/teacher devices.

9. The system as claimed in claim 8, wherein the tracking and authorization module generates and stores bus and route information for the buses and the students based on the location information and the event information.

10. The system as claimed in claim 8, wherein the tracking and authorization module generates bus proximity information with respect to stops assigned to the students based on the location information and sends the bus proximity information to parent/teacher devices operated by parents of the students.

11. The system as claimed in claim 8, wherein the tracking and authorization module generates optimal route information based on the location information and the event information and sends the optimal route information to parent/teacher devices operated by drivers of the buses.

12. The system as claimed in claim 1, wherein the tracking and authorization module generates occupancy information for the buses based on the event information and sends the occupancy information to the parent/teacher devices.

13. A system for tracking students of schools, the system comprising:
    readers comprising wireless receivers for receiving identification information from tags during entering and exiting events of the students; and
    a tracking and authorization module for generating event information for the entering and exiting events based on the identification information received by the readers and sending the event information to parent/teacher devices,
    wherein the readers comprise global navigation satellite system (GNSS) receivers and generate location information for buses based on GNSS data received by the GNSS receivers, and the tracking and authorization module receives the location information and sends the location information to the parent/teacher devices, and wherein the tracking and authorization module generates anomaly information based on accumulated location information and bus and route information for the buses and sends the anomaly information to the parent/teacher devices.

14. The system as claimed in claim 1, wherein the readers or the tags are installed at emergency doors of the buses, and the tracking and authorization module sends alerts to the parent/teacher devices in response to determining that the emergency doors were accessed based on the event information.

15. A system for tracking students of schools, the system comprising:

readers comprising wireless receivers for receiving identification information from tags during entering and exiting events of the students; and a tracking and authorization module for generating event information for the entering and exiting events based on the identification information received by the readers and sending the event information to parent/teacher devices, wherein the readers or the tags are stationed at entrance and exit points of the school, and the exiting and entering events represent instances of the students entering and exiting the school, and wherein the readers stationed at the entrance and exit points include mobile computing devices operated by faculty, administrators and/or security personnel of the school, and the tracking and authorization module verifies the entering and exiting events based on whether the readers also received identification information from tags installed on authorized vehicles associated with the students.

16. A system for tracking students of schools, the system comprising:

readers comprising wireless receivers for receiving identification information from tags during entering and exiting events of the students; and a tracking and authorization module for generating event information for the entering and exiting events based on the identification information received by the readers and sending the event information to parent/teacher devices, wherein the readers or the tags are stationed at entrance and exit points of the school, and the exiting and entering events represent instances of the students entering and exiting the school, and further comprising surveillance cameras for capturing image data depicting entering and exiting events at the entrance and exit points of the school, wherein the tracking and authorization module receives the image data, detects entering and exiting events based on the image data, determines whether identification information corresponding to the detected entering and exiting events was received from the readers, and generates alerts in response to determining that no corresponding identification information was received.

17. The system as claimed in claim 1, wherein the readers or the tags are stationed at entrance and exit points of classrooms of the school, the exiting and entering events represent instances of the students and/or other authorized individuals entering and exiting the classrooms, and the tracking and authorization module generates attendance information based on the event information and sends the attendance information to the parent/teacher devices.

18. A method for tracking students of schools, the method comprising:

readers receiving identification information from tags during entering and exiting events of the students; and generating event information for the entering and exiting events based on the identification information received by the readers and sending the event information to parent/teacher devices, wherein the readers or the tags are installed on buses for transporting the students to and from the schools, and the exiting and entering events represent instances of the students entering and exiting the school buses, and further comprising generating anomaly information based on accumulated location information and on stored bus and route information for the buses and sending the anomaly information to the parent/teacher devices.

19. A method for tracking students of schools, the method comprising:

readers receiving identification information from tags during entering and exiting events of the students; and generating event information for the entering and exiting events based on the identification information received by the readers and sending the event information to parent/teacher devices, wherein the readers or the tags are stationed at entrance and exit points of the school, and the exiting and entering events represent instances of the students and/or other authorized individuals entering and exiting the school, and further comprising verifying the entering and exiting events based on whether the readers also received identification information from vehicle devices installed on authorized vehicles associated with the students, wherein the readers include mobile computing devices operated by faculty, administrators and/or security personnel of the school.

20. A method for tracking students of schools, the method comprising:

readers receiving identification information from tags during entering and exiting events of the students; and generating event information for the entering and exiting events based on the identification information received by the readers and sending the event information to parent/teacher devices, wherein the readers or the tags are stationed at entrance and exit points of the school, and the exiting and entering events represent instances of the students and/or other authorized individuals entering and exiting the school, and further comprising detecting entering and exiting events based on image data captured by surveillance cameras, determining whether identification information corresponding to the detected entering and exiting events was received from the readers, and generating alerts in response to determining that no corresponding identification information was received.

* * * * *